(12) United States Patent
Yi et al.

(10) Patent No.: US 7,706,537 B2
(45) Date of Patent: *Apr. 27, 2010

(54) METHOD FOR RELOCATING SRNS IN A MOBILE COMMUNICATION SYSTEM

(75) Inventors: Seung June Yi, Seoul (KR); Woon Young Yeo, Kyungki-Do (KR); So Young Lee, Kyungki-Do (KR); Hyo Sang Han, Incheon (KR)

(73) Assignee: LG Electronics Inc., Seoul (KR)

( * ) Notice: Subject to any disclaimer, the term of this patent is extended or adjusted under 35 U.S.C. 154(b) by 226 days.

This patent is subject to a terminal disclaimer.

(21) Appl. No.: 11/949,518

(22) Filed: Dec. 3, 2007

(65) Prior Publication Data

US 2008/0293416 A1 Nov. 27, 2008

Related U.S. Application Data

(63) Continuation of application No. 10/365,655, filed on Feb. 13, 2003, now Pat. No. 7,356,146.

(30) Foreign Application Priority Data

Feb. 16, 2002 (KR) .................... 2002-8341

(51) Int. Cl.
*H04L 9/00* (2006.01)
(52) U.S. Cl. ..................................... 380/262
(58) Field of Classification Search ........... 380/262
See application file for complete search history.

(56) References Cited

U.S. PATENT DOCUMENTS 6,725,040 B2 * 4/2004 Jiang ..................... 455/436

(Continued)

FOREIGN PATENT DOCUMENTS

EP 1 276 279 1/2003

(Continued)

OTHER PUBLICATIONS

Japanese Office Action dated Dec. 25, 2007.

(Continued)

*Primary Examiner*—Kambiz Zand
*Assistant Examiner*—William S Powers
(74) *Attorney, Agent, or Firm*—McKenna Long & Aldridge LLP

(57) ABSTRACT

A system and method for performing SRNS relocation in a communications system transmits radio resource information including a ciphering parameter from a source RNC to a target RNC, modifies the ciphering parameter to coincide with a deciphering parameter which a user terminal uses when out-of-sequence data is received, ciphers a data unit based on the modified ciphering parameter, and transmits the ciphered data unit from the target RNC to the user terminal. The method may be modified to operate in UM mode or AM mode and to transmit data over one of several radio bearers. In accordance with another embodiment, the system and method transmits radio resource information from a source RNC to a target RNC and then transmits a data unit from the target RNC to a user terminal. In this case, the data unit including a transmission sequence number which consecutively follows a transmission sequence number of a data unit last transmitted from the source RNC to the user terminal. In accordance with another embodiment, the system and method resets ciphering and state variables in a target RNC and then transmits a message instructing a user terminal to reset a deciphering and state variables to the same or similar values. All the embodiments are advantageous because they ensure successful communications will take place between the target RNC and user terminal after a serving radio network sub-system relocation procedure is performed.

53 Claims, 11 Drawing Sheets

U.S. PATENT DOCUMENTS

| | | | |
|---|---|---|---|
| 6,768,903 | B2 * | 7/2004 | Fauconnier et al. ......... 455/403 |
| 6,782,274 | B1 * | 8/2004 | Park et al. ............... 455/552.1 |
| 6,845,095 | B2 * | 1/2005 | Krishnarajah et al. ....... 370/349 |
| 2002/0013147 | A1 | 1/2002 | Fauconnier et al. |
| 2002/0107019 | A1 | 8/2002 | Mikola et al. |
| 2003/0153309 | A1 | 8/2003 | Bjelland et al. |
| 2003/0165161 | A1 | 9/2003 | Kallilkuju et al. |
| 2003/0235213 | A1 | 12/2003 | Kuo |

FOREIGN PATENT DOCUMENTS

| | | |
|---|---|---|
| EP | 1 276 293 | 1/2003 |
| EP | 1 328 133 | 7/2003 |
| EP | 1 343 267 | 9/2003 |
| KR | 2001-27626 | 4/2001 |
| WO | WO 99/09774 | 2/1999 |
| WO | WO 00/54464 | 9/2000 |
| WO | WO 00/60824 | 10/2000 |
| WO | WO 00/62484 | 10/2000 |
| WO | WO 01/11911 | 2/2001 |
| WO | WO 02/15524 | 2/2002 |

OTHER PUBLICATIONS

R2-001286, 3GPP TSG SA WG3 Security—S3#16, Sophia Antipolis, France, Nov. 28-30, 2000, "LS on Security Issue," S3-000648.

R2-011687, 3GPP TSG-RAN WG2 Meeting #22, Berlin, German, Jul. 9-13, 2001, "RLC Re-establishment During SRNS Relocation."

R2-012171, TSG-RAN Working Group 2 #23, Helsinki, Finland, Aug. 26-31, 2001, "Correction to SRNS Relocation."

ETSI TS 125 303 V3.9.0 (Sep. 2001); Universal Mobile Telecommunications System (UMTS); Interlayer Procedures in Connected Mode (3GPP TS 25.303 version 3.9.0 Release 1999) pp. 1-81.

ETSI TS 123 060 V4.3.0 (Jan. 2002); Digital Cellular Telecommunications System (Phase 2+)(GSM); Universal Mobile Telecommunications System (UMTS); General Packet Radio Services (GPRS) Service Description Stage 2; (3GPP TS 23.060 version 4.3.0 Release 4) XP-002406009; pp. 74-88.

European Search Report dated Nov. 23, 2006.

3$^{rd}$ Generation Partnership Project; Technical Specification Group Radio Access Network; Interlayer Procedures in Connected Mode, 3GPP TS 25.303 Version 3.9.0, Sep. 2001, pp. 38, 59-67, and 74.

* cited by examiner

FIG.3
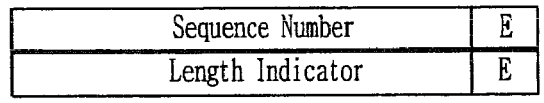
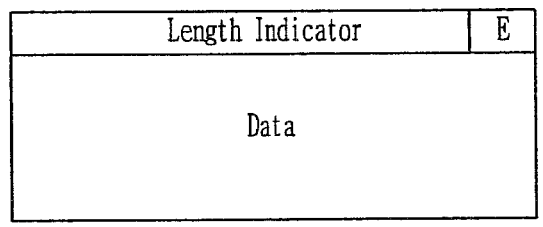
FIG.4
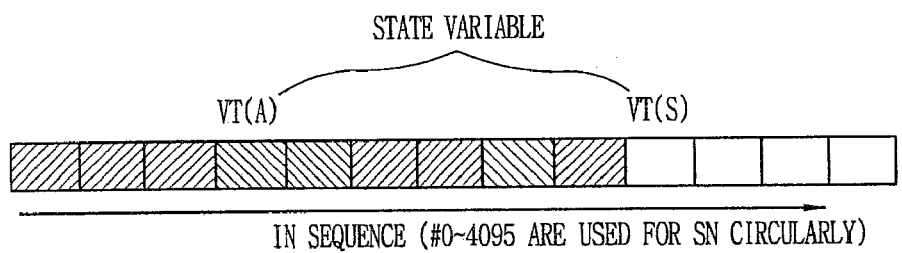
VT(S) : THE SEQUENCE NUMBER OF THE RLC PDU TO BE TRANSMITTED NEXT TIME
VT(A) : THE MOST PRIOR SEQUENCE NUMBER OF THE RLC PDU TO BE RETRANSMITTED

METHOD FOR RELOCATING SRNS IN A MOBILE COMMUNICATION SYSTEM

CROSS-REFERENCE TO RELATED APPLICATIONS

This application is a Continuation Application of prior U.S. patent application Ser. No. 10/365,655 filed Feb. 13, 2003, now U.S. Pat. No. 7,356,146, which claims priority under 35 U.S.C. 119 to Korean Application No. 08341/2002 filed on Feb. 16, 2002, whose entire disclosures are hereby incorporated by reference.

BACKGROUND OF THE INVENTION

1. Field of the Invention

This invention generally relates to wireless communication systems, and more particularly to a system and method for performing a serving radio network sub-system (SRNS) relocation procedure in a communications system.

2. Background of the Related Art

A universal mobile telecommunications system (UMTS) is a third generation mobile communication system that has evolved from a standard known as Global System for Mobile communications (GSM). This standard is a European standard which aims to provide an improved mobile communication service based on a GSM core network and wideband code division multiple access (W-CDMA) technology. In December, 1998, the ETSI of Europe, the ARIB/TTC of Japan, the T1 of the United States, and the TTA of Korea formed a Third Generation Partnership Project (3GPP) for the purpose of creating a specification for standardizing the UMTS.

The work towards standardizing the UMTS performed by the 3GPP has resulted in the formation of five technical specification groups (TSG), each of which is directed to forming network elements having independent operations. More specifically, each TSG develops, approves, and manages a standard specification in a related region. Among them, a radio access network (RAN) group (TSG-RAN) develops a specification for the function, items desired, and interface of a UMTS terrestrial radio access network (UTRAN), which is a new RAN for supporting a W-CDMA access technology in the UMTS.

The TSG-RAN group includes a plenary group and four working groups. Working group 1 (WG1) develops a specification for a physical layer (a first layer). Working group 2 (WG2) specifies the functions of a data link layer (a second layer) and a network layer (a third layer). Working group 3 (WG3) defines a specification for an interface among a base station in the UTRAN, a radio network controller (RNC), and a core network. Finally, Working group 4 (WG4) discusses terms desired for a radio link performance and items desired for radio resource management.

FIG. 1 shows a structure of a 3GPP UTRAN to which the present invention may be applied. This UTRAN includes one or more radio network sub-systems (RNS). Each RNS includes an RNC and one or more Nodes B (e.g., a base station) managed by the RNCs. RNCs are connected to a mobile switching center (MSC) which performs line exchange communications with the GSM network. The RNCs are also connected to a serving general packet radio service support node (SGSN) which performs packet exchange communications with a general packet radio service (GPRS) network.

Nodes B are managed by the RNCs, receive information sent by the physical layer of a terminal (e.g., mobile station, user equipment and/or subscriber unit) through an uplink, and transmit data to a terminal through a downlink. Nodes B, thus, operate as access points of the UTRAN for the terminal.

The RNCs perform functions which include assigning and managing radio resources. An RNC that directly manages a Node B is referred to as a control RNC (CRNC). The CRNC manages common radio resources. A serving RNC (SRNC), on the other hand, manages dedicated radio resources assigned to the respective terminals. The CRNC can be the same as the SRNC. However, when the terminal deviates from the region of the SRNC and moves to the region of another RNC, the CRNC can be different from the SRNC. Because the physical positions of various elements in the UMTS network can vary, an interface for connecting the elements is necessary. Nodes B and the RNCs are connected to each other by an Iub interface. Two RNCs are connected to each other by an Iur interface. An interface between the RNC and a core network is referred to as Iu.

Services provided to the UE may generally be classified into circuit-switching services and packet-switching services. A voice telephone service may be included in the circuit-switching service and a Web-browsing service may be included in a packet-switching service through an Internet connection. The circuit-switching service is connected to an MSC of the core network, and this MSC is connected to a gateway mobile switching center (GMSC) for communicating with one or more external networks. The GMSC manages the connections between the MSC and the external networks.

The packet-switching service is connected to a serving general packet radio service (GPRS) support node (SGSN), this node is connected to a gateway GPRS support node (GGSN) of the core network. The SGSN communicates packets between the SRNC and GGSN, and the GGSN manages connections between the SGSN and another packet-switching network such as the Internet.

A variety of interfaces are provided for performing mutual data exchanges between these network components. An interface between an RNC and the core network is known as an Iu interface. When the In is connected to the packet-switching domain, it is called an Iu PS interface, and when the Iu is connected to the circuit-switching domain it is called a Iu CS interface.

FIG. 2 shows a structure of a radio access interface protocol between a terminal which operates based on a 3GPP RAN specification and a UTRAN. The radio access interface protocol is horizontally formed of a physical layer (PHY), a data link layer, and a network layer and is vertically divided into a control plane for transmitting control information and a user plane for transmitting data information. The user plane is a region to which traffic information of a user such as voice or an IP packet is transmitted. The control plane is a region to which control information such as an interface of a network or maintenance and management of a call is transmitted.

In FIG. 2, protocol layers can be divided into a first layer (L1), a second layer (L2), and a third layer (L3) based on three lower layers of an open system interconnection (OSI) standard model well known in a communication system. The first layer (L1) operates as a physical layer (PHY) for a radio interface and is connected to an upper medium access control (MAC) layer through one or more transport channels. The physical layer transmits data delivered to the physical layer (PHY) through a transport channel to a receiver using various coding and modulating methods suitable for radio circumstances. The transport channel between the physical layer (PHY) and the MAC layer is divided into a dedicated transport channel and a common transport channel based on whether it is exclusively used by a single terminal or shared by several terminals.

The second layer L2 operates as a data link layer and lets various terminals share the radio resources of a W-CDMA network. The second layer L2 is divided into the MAC layer, a radio link control (RLC) layer, a packet data convergence protocol (PDCP) layer, and a broadcast/multicast control (BMC) layer.

The MAC layer delivers data through an appropriate mapping relationship between a logical channel and a transport channel. The logical channels connect an upper layer to the MAC layer. Various logical channels are provided based on the kind of transmitted information. In general, when information of the control plane is transmitted, a control channel is used. When information of the user plane is transmitted, a traffic channel is used. The MAC layer is divided two sub-layers according to performed functions. The two sub-layers are a MAC-d sub-layer that is positioned in the SRNC and manages the dedicated transport channel and a MAC-c/sh sub-layer that is positioned in the CRNC and manages the common transport channel.

The RLC layer forms an appropriate RLC protocol data unit (PDU) suitable for transmission by the segmentation and concatenation functions of an RLC service data unit (SDU) received from an upper layer. The RLC layer also performs an automatic repeat request (ARQ) function by which an RLC PDU lost during transmission is re-transmitted. The RLC layer operates in three modes: a transparent mode (TM), an unacknowledged mode (UM), and an acknowledged mode (AM). The mode selected depends upon the method used to process the RLC SDU received from the upper layer. An RLC buffer stores the RLC SDUs or the RLC PDUs received from the upper layer. A more detailed explanation of the modes of operation of the RLC layer will follow.

The packet data convergence protocol (PDCP) layer is an upper layer of the RLC layer which allows data items to be transmitted through a network protocol such as IP.v4 or IP.v6. A header compression technique for compressing and transmitting the header information in a packet can be used for effective transmission of the IP packet.

The broadcast/multicast control (BMC) layer allows a message to be transmitted from a cell broadcast center (CBC) through the radio interface. The main function of the BMC layer is scheduling and transmitting a cell broadcast message to a terminal. In general, data is transmitted through the RLC layer operating in the unacknowledged mode.

The PDCP layer and the BMC layer are connected to the SGSN because a packet exchange method is used, and are located only in the user plane because they transmit only user data. Unlike the PDCP layer and the BMC layer, the RLC layer can be included in the user plane and the control plane according to a layer connected to the upper layer. When the RLC layer belongs to the control plane, data is received from a radio resource control (RRC) layer.

In general, the transmission service of user data provided to the upper layer by the second layer (L2) in the user plane is referred to as a radio bearer (RB). The transmission service of control information provided to the upper layer by the second layer (L2) in the control plane is referred to as a signaling radio bearer (SRB). As shown in FIG. 2, a plurality of entities can exist in the RLC and PDCP layers. This is because a terminal has a plurality of RBs, and one or two RLC entities and only one PDCP entity are generally used for one RB. The entities of the RLC layer and the PDCP layer can perform an independent function in each layer.

The RRC layer positioned in the lowest portion of the third layer (L3) is defined only in the control plane and controls the logical channels, the transport channels, and the physical channels in relation to the setting, the re-setting, and the cancellation of the RBs. At this time, setting up the RB means processes of stipulating the characteristics of a protocol layer and a channel, which are required for providing a specific service, and setting the respective detailed parameters and operation methods. It is possible to transmit control messages received from the upper layer through a RRC message.

Operation of the radio bearer and the RLC layer will be now described in detail. As previously discussed, a radio bearer (RB) is a transmission service which delivers user data in the user plane to an upper layer through the second layer L2. The transmission service which delivers control information in the control plane to the upper layer through the second layer L2 is defined as a signaling radio bearer (SRB).

As previously noted, the RLC layer operates in one of three modes: transparent mode (TM), unacknowledged mode (UM), and acknowledged mode (AM).

When operating in the TM mode, header information is not added to the RLC SDU received from the upper layer, no sequence number is attached to the RLC PDU and data re-transmission is not performed. Also, though segmentation and reassembly of the RLC SDU are generally not performed, use of segmentation and reassembly when the radio bearer is set up is determined in certain circumstances.

When operating in UM mode, re-transmission of RLC PDUs is not performed even when a transmission failure occurs. The receiver does not request retransmission of data. Instead, a different approach is taken. In UM mode, the RLC layer constructs RLC PDUs by segmenting or concatenating RLC SDUs, and then attaching sequence numbers to the RLC PDUs. The receiver can restore lost data based on the sequence numbers by a re-assembly procedure.

When operating in the AM mode, re-transmission is used to support error-free transmission in the following manner. Status information corresponding to received RLC PDUs is transmitted from the receiver in the form of a Status Report. After receiving this report, the transmitter re-transmits unsuccessfully transmitted RLC PDUs.

More specifically, in AM mode, the transmitter forms each RLC PDU from one or more RLC SDUs that have been received from an upper layer, and header information, (e.g. sequence number and length indicators) are then attached. Since the size of an AM RLC PDU is fixed, the transmitter segments or concatenates one or more RLC SDUs to fit the PDU size. Then, the formed RLC PDU is stored in the transmission buffer. The stored RLC PDUs are sequentially delivered to the MAC layer at a rate controlled by the MAC layer. Since each RLC PDU has its own sequence number, the receiver can check which RLC PDUs are successfully received and which are not. The receiver requests the retransmission for the unsuccessfully received RLC PDUs to the transmitter by the Status Report.

The AM retransmission procedure may be more clearly understood by the following example. If the sequence numbers of the received RLC PDUs are #23, #24, #25, #32, and #34, the receiver considers that RLC PDUs having the sequence numbers of #26 to #31 and #33 are lost during transmission. The receiver then sends a Status Report to the transmitter, and the transmitter checks the Status Report, and re-transmits the unsuccessfully transmitted RLC PDUs, i.e. #26 to #31 and #33.

FIG. 3 shows the structure of an RLC PDU of AM or UM mode used in the RLC layer. The RLC PDU is comprised of a header and a payload. The header shown includes a sequence number and a length indicator. The sequence number is used as an identifier of the corresponding RLC PDU, and the length indicator indicates a boundary of the RLC SDU. The sequence numbers may be, for example, 7 (seven) bits for UM mode, and 12 (twelve) bits for AM mode. A 1 (one) bit E field may be included to indicate whether the next field is the length indicator or data.

The length indicator is used to indicate the boundary of each RLC SDU ending within the RLC PDU. Therefore, the length indicator may not be present if the RLC SDU is not ended within the RLC PDU. The length indicator may also be used for other purposes. For example, the length indicator may be used as a padding indicator and/or a data start indicator. Padding is used to fill the whole RLC PDU when there is no RLC SDU to be concatenated. The padding can have any value and the receiver and the sender disregard it. When used as a data start indicator the length indicator may indicate that the RLC SDU begins in the beginning of the RLC PDU.

The data start indicator is useful because it can prevent additional loss of data in the UM RLC. For example, assume that an RLC PDU of sequence number #4 is lost and an RLC PDU of sequence number #5 is received. Assume further that a new RLC SDU begins at the beginning of the PDU of sequence number #5 and ends within the PDU of sequence number #5. In this case, because the RLC SDU begins at the beginning of the PDU of sequence number #5, the data start indicator is present at the header of the PDU of sequence number #5. But, if the data start indicator is not present, the receiver RLC layer considers that only continued segments of an RLC SDU contained in the RLC PDU of sequence number #5 is received. In this case, the receiver discards the segments because the receiver thinks that the entire RLC SDU has not been received.

FIG. 4 shows an exemplary snapshot of the status of an RLC buffer. As shown, the RLC PDUs are sequentially stored in the buffer and the successfully transmitted RLC PDUs are deleted from the buffer. As shown, the RLC layer uses state variables for managing the transmission of data using the RLC buffer.

When operating in AM mode, the RLC layer uses a state variable VT(S) to indicate the sequence number of the next RLC PDU to be transmitted for the first time, and a state variable VT(A) to indicate the sequence number of the first RLC PDU to be positively acknowledged by the receiver. The status of the buffer therefore indicates that the transmitter has transmitted RLC PDUs up to the PDU of sequence number of VT-1 and has received positive acknowledgments up to the RLC PDU of VT(A)-1 from the receiver.

When operating in the UM mode, the RLC layer uses a state variable VT(US) which is similar to VT in AM mode. That is, VT(US) indicates the sequence number of the next RLC PDU to be transmitted. However, since there is no feedback from the receiver in UM mode, the state variable such as VT(A) is not defined.

In both modes of operation, the initial value of the state variables may be set to 0 (zero). When the RLC layer is established, reestablished or reset, the state variables are set to this initial value.

Returning now to radio communications protocol shown in FIG. 2, as previously indicated, the service provided to the upper layer by the second layer L2 in the control plane is defined as a signaling radio bearer (SRB). In operation, all RRC messages are exchanged between the terminal and the RNC through the signaling radio bearers SRBs. Using the RRC messages, the RNC can setup, modify, and release the radio bearers as needed in order to, for example, perform an SRNS relocation procedure, the details of which are described in greater detail below.

Signaling radio bearer (SRB) characteristics as previously indicated are determined based on the mode of operation of the RLC and the type of logical channel used. A common control channel (CCCH) and dedicated control channel (DCCH) are used for the SRBs. CCCH is a logical channel carrying common control information to several terminals. Since CCCH is a common logical channel, CCCH contains a UTRAN radio network temporary identity (U-RNTI) to identify a specific terminal. The DCCH is a logical channel carrying dedicated control information to a specific terminal.

The characteristics of each type of SRB are as follows.

SRB0: For the uplink (UL) TM RLC is used, and for the downlink (DL)UM RLC is used. The logical channel used for the SRB0 is CCCH.

SRB1: UM RLC is used, and the logical channel is DCCH.

SRB2: AM RLC is used, and the logical channel is DCCH. The SRB2 carries only the messages generated in the RRC layer. The SRB2 does not carry the upper layer messages.

SRB3: AM RLC is used, and the logical channel is DCCH. The SRB3 carries the messages received from the upper layer.

SRB4: AM RLC is used, and the logical channel is DCCH. The SRB4 also carries the messages received from the upper layer. The difference is that the SRB3 carries higher priority messages while the SRB4 carries lower priority messages.

SRB5-31: TM RLC is used, and the logical channel is DCCH. These SRBs are optionally used.

SRNS Relocation Procedure

FIG. 5 is a diagram showing how a serving radio network sub-system (SRNS) procedure may be performed in a packet-switching based service domain. As shown, this procedure involves changing the RNS serving a user terminal from one RNS (or RNC) to another. When making this change, it is preferable to establish the shortest route between the terminal and core network by changing the Iu connection point. As is further shown, changing the Iu connection point may in some instances cause the core network to switch from one SGSN (Old SGSN) to another (New SGSN) for purposes of performing communications with the user terminal. The SRNS relocation procedure may also be performed in the circuit-switching based service domain.

An SRNS relocation procedure may be performed for at least the following reasons:

Connection Point Change: Relocation is performed to move the UTRAN to a CN connection point at the UTRAN side from the source RNC to the target RNC.

Combined Hard Handover: Relocation is performed to move the UTRAN to a CN connection point at the UTRAN side from the source RNC to the target RNC, while performing a hard handover decided by the UTRAN.

Combined Cell/URA Update: Relocation is performed to move the UTRAN to the CN connection point at the UTRAN side from the source RNC to the target RNC, while performing a cell re-selection in the UTRAN.

As will be discussed in greater detail, an SRNS relocation procedure may require the use of different radio bearers depending upon the mode of operation of the RLC layer.

SRNS relocation is usually classified into two cases: (1) terminal not involved case (Case I) and (2) terminal involved case (Case II). In Case I, SRNS relocation is initiated by a network's own decision and the terminal does not know whether the SRNS relocation is performed until the relocation procedure is terminated. In Case II, SRNS relocation is initiated as a result of the terminal's cell change (e.g., handover) request and the terminal knows the SRNS relocation at the beginning of the procedure. Though Cases I and II are different in that one is involved with the terminal and the other is not, the two cases have no substantial difference with respect to the SRNS relocation procedure. A more detailed explanation of this procedure now follows.

During the SRNS relocation procedure, various signaling messages are exchanged between the terminal and one RNC, between the one RNC and another RNC, and between one of the RNCs and the core network.

FIG. 6 shows the exchange of signaling messages that takes place between the terminal and core network in the SRNS relocation procedure of the UMTS. In this exchange, the "source RNC" is the RNC that plays the role of the SRNC before SRNS relocation and the "target RNC" is the RNC that plays the role of the SRNC after SRNS relocation. Likewise, the "old SGSN" is the SGSN before the relocation procedure and the "new SGSN" is the SGSN after the relocation procedure. Though the old and new SGSNs are shown to be different, the old SGSN and new SGSN may be the same in certain circumstances. Moreover, the procedure shown in FIG. 6 may be applied to both Case I and Case II.

The steps of the SRNS relocation procedure will now be summarized. In an initial step, step 1, the source RNC decides to perform an SRNS relocation. Either Case I or Case II may be used to trigger the relocation procedure.

In step 2, the source RNC sends a Relocation Required message to the old SGSN. The Relocation Required message includes information for performing, for example, relocation co-ordination, security functionality, RRC protocol context information, and the terminal capabilities.

In step 3, the old SGSN determines from the Relocation Required message if the SRNS relocation is intra-SGSN or inter-SGSN SRNS relocation. An intra-SGSN procedure is performed when the old and new SGSNs are the same, and an inter-SGSN procedure is performed when the two are different. A Forward Relocation Request message is applicable only in the case of inter-SGSN SRNS relocation.

In step 4, the new SGSN sends a Relocation Request message to the target RNC so that the necessary resources are allocated between the target RNC and the new SGSN. After all necessary resources are successfully allocated, the target RNC sends the Relocation Request Acknowledge message to the new SGSN.

In step 5, when a resource for the transmission of user data between the target RNC and the new SGSN have been allocated and the new SGSN is ready for SRNS relocation, the Forward Relocation Response message is sent from the new SGSN to old SGSN.

In step 6, the old SGSN continues SRNS relocation by sending a Relocation Command message to the source RNC. The source RNC is ready for forward downlink user data directly to the target RNC.

In step 7, when the source RNC is ready for data-forwarding, it triggers execution of SRNS relocation by sending a Relocation Commit message to the target RNC.

In step 8, the source RNC begins to forward data for the radio access bearers. The data forwarding may be carried out through the Iu interface, which means that data is not directly exchanged between the source RNC and the target RNC but through the core network.

In step 9, the target RNC sends a Relocation Detect message to the new SGSN. When the Relocation Detect message is sent, the target RNC starts SRNC operation.

In step 10, the target RNC sends a UTRAN mobility information (Case I) message or a Cell/URA (UTRAN registration area) update (Case II) message to the terminal. Both messages contain terminal information elements and core network information elements. The terminal information elements include new U-RNTI used for the identification of the terminal in the target RNC. The core network information elements include location area identification and routing area identification information.

Upon receipt of the UTRAN Mobility Information message the terminal can start sending uplink (UL) user data to the target RNC. When the terminal has reconfigured itself, it sends the UTRAN Mobility Information Confirm message to the target RNC. This indicates that the terminal is also ready to receive downlink (DL) data from the target RNC.

In step 11, upon receipt of the Relocation Detect message the core network switches the user plane from source RNC to target RNC. In the case of an inter-SGSN SRNS relocation, the new SGSN sends Update PDP Context Request messages to the GGSNs concerned. The GGSNs update their PDP context fields and return an Update PDP Context Response.

In step 12, when the target RNC receives the UTRAN Mobility Information Confirm message, (i.e., the new U-RNTI is successfully exchanged with the terminal by the radio protocols), the target RNC sends the Relocation Complete message to the new SGSN. The purpose of the Relocation Complete message is to indicate by the target RNC completion of the relocation of the SRNS to the core network. In the case of an inter-SGSN SRNS relocation, the new SGSN signals the old SGSN of the completion of the SRNS relocation procedure by sending a Forward Relocation Complete message.

In step 13, upon receiving the Relocation Complete message or the Forward Relocation Complete message, the old SGSN sends an Iu Release Command message to the source RNC so that the Iu connection between the source RNC and the old SGSN is released.

FIG. 7 shows the steps of the SRNS relocation procedure including the exchange of RRC messages between the UTRAN and the terminal. In this figure, RRC messages are transmitted at steps 1, 7, and 8, and the UTRAN can either be the source RNC or target RNC depending on the case. Also, UE refers to user equipment and therefore may include a user terminal. The RRC messages transmitted in this procedure are described as follows.

(1) Cell Update message and Cell Update Confirm message: When the terminal moves to a new cell, a Cell Update message is sent from the terminal to the UTRAN. If the UTRAN decides to perform SRNS relocation, the target RNC sends the Cell Update Confirm message to the terminal as a response to the Cell Update message. The Cell Update Confirm message contains the new U-RNTI, which indicates to the terminal the SRNS relocation procedure being performed. The Cell Update message is transmitted through SRB0 using TM RLC, and the Cell Update Confirm message is through either SRB0 or SRB1 using UM RLC.

(2) URA Update message and URA Update Confirm message: A URA (UTRAN registration area) is an area comprised of one or several cells, and is internally known to the UTRAN. The URAs may partially overlap in order to prevent a ping-pong effect of the terminal. Therefore, one cell can belong to one or more URAs. The terminal knows the current URA identity from the URA list broadcast in each cell and performs the URA update procedure whenever the URA is changed.

The URA update procedure is initiated when the terminal sends the URA Update message to the UTRAN. The UTRAN transmits the URA Update Confirm message in response to the URA Update message to the terminal, in order to inform the terminal of the new URA identity. The URA Update Confirm message includes a new U-RNTI which is the same as in the Cell Update Confirm message. The URA Update message is transmitted through SRB0 using TM RLC, and the URA Update Confirm message is transmitted through SRB0 or SRB1 using UM RLC.

(3) UTRAN Mobility Information message and UTRAN Mobility Information Confirm message: The UTRAN Mobility Information message is used when the UTRAN assigns a new U-RNTI to the terminal or when mobility information is transmitted. The terminal transmits UTRAN Mobility Information Confirm message in response. After successfully transmitting the UTRAN Mobility Information Confirm message, the target RNC and the terminal establish/re-establish the PDCP and RLC entities using CPDCP-CONFIG-Req and CRLC-CONFIG-Req commands, respectively. The UTRAN Mobility Information message is transmitted through SRB1 using UM RLC or SRB2 using AM RLC. The UTRAN mobility Information Confirm message is transmitted through SRB2 using AM RLC.

Ciphering

The SRNS relocation procedure has been described in terms of the steps taken in both the UMTS system and the UTRAN. From this description, it is clear that the SRNS relocation procedure is primarily based on the exchange of messages between the terminal and RNC, and between the RNC and the core network. Among these messages, RRC messages exchanged between the terminal and the RNC are usually ciphered for the sake of security.

In some cases, the ciphered RRC messages cannot be deciphered in the receiver because the ciphering parameters are different between the terminal and the UTRAN. In order to gain a better understanding of this problem, the ciphering method in general must first to be considered.

Ciphering is a method which prevents unauthorized access of data, for example, as a result of eavesdropping. Because unique ciphering parameters exist between the terminal and the RNC, a user who does not know the ciphering parameters cannot decipher the data.

The ciphering method adopted by the 3GPP is performed in the RLC layer or the MAC layer according to the RLC mode of operation. That is, when the RLC mode is AM or UM, ciphering is performed in the RLC layer. When the RLC mode is TM, ciphering is performed in the MAC layer. Preferably, in this system ciphering is applied only for the DCCH and DTCH channels.

During this ciphering method, a MASK used for ciphering is generated based on various input parameters. The MASK is then added to RLC PDUs or MAC SDUs to generate the ciphered data. In the user terminal, the same MASK is used to decipher the data.

FIG. 8 shows steps included in the ciphering process. Here, PLAINTEXT BLOCK is the data before ciphering and KEYSTREAM BLOCK is a ciphering MASK. The PLAINTEXT BLOCK is ciphered to CIPHERTEXT BLOCK through a bit operation with the KEYSTREAM BLOCK. Then, the ciphered CIPHERTEXT BLOCK is transmitted to a radio interface. After receiving the CIPHERTEXT BLOCK, the receiver deciphers it by applying the KEYSTREAM BLOCK that is the same MASK as in the transmitter. That is, if the ciphered data is extracted during transmission, the data cannot be deciphered unless the KEYSTREAM BLOCK is known.

The core technology of ciphering lies in the generation of the KEYSTREAM BLOCK, i.e. the ciphering MASK. To achieve effective results, the MASK should have the following characteristics. First, generation of the MASK by reverse tracing should be impossible. Second, each radio bearer RB should have its own MASK. Third, the MASK should continuously change over time.

Among the various ciphering algorithms that exist, a method referred to as F8 has been adopted by 3GPP communications systems. The F8 algorithm generates the KEYSTREAM BLOCK using input parameters including:

CK (Ciphering key, 128 bits): There is one CK.sub.CS for a circuit-switching based service domain and one CK.sub.PS for a packet-switching based service domain.

BEARER (Radio Bearer Identifier, 5 bits): One value exists for each RB.

DIRECTION (Direction Identifier, 1 bit): Indicates the direction of the RB. It is set to 0 for uplink and 1 for downlink.

LENGTH (16 bits): Indicates the length of the KEYSTREAM BLOCK, i.e. the generated MASK.

COUNT-C (32 bits): A ciphering sequence number. For RBs using AM or UM RLC, one COUNT-C is used for each RB. For RBs using TM RLC, one COUNT-C value is used for all the RBs. Those skilled in the art can appreciate that the bit and other values provided above are preferred values and may be changed if desired.

Among the ciphering input parameters, COUNT-C is the only time-varying parameter. That is, different COUNT-C values are used for each PDU. Other ciphering input parameters are fixed parameters and therefore the same values may be used for these parameters for all PDUs in a data stream. The COUNT-C parameter is divided into two parts: a forward part and a rear part. The forward part includes a long sequence number and the rear part includes a short sequence number.

FIG. 9 shows detailed structures of the COUNT-C parameter for the various modes of operation of the RLC layer. The respective structures are as follows:

TM RLC case long sequence number: MAC-d Hyper Frame Number (HFN) of 24 bits short sequence number: Connection Frame Number (CFN) of 8 bits UM RLC case long sequence number: RLC Hyper Frame Number (HFN) of 25 bits short sequence number: RLC UM Sequence Number (SN) of 7 bits AM RLC case long sequence number: RLC Hyper Frame Number (HFN) of 20 bits short sequence number: RLC AM Sequence Number (SN) of 12 bits The CFN is a counter for synchronizing the transport channels of the MAC layer between the terminal and the UTRAN. The CFN may have a value between 0 and 255 and it increases by one for each radio frame (10 ms).

The RLC SN is a sequence number used for identifying each RLC PDU. For UM RLC, the RLC SN has a value between 0 and 127 (7 bits). For AM RLC, the RLC SN has a value between 0 and 4095 (12 bits). The RLC SN increases by 1 for each RLC PDU.

Since a short sequence number is too short to be used alone for COUNT-C, a long sequence number known as HFN is added in front of the short sequence number. More specifically, the HFN corresponds to the MSBs (Most Significant Bits) and short sequence number corresponds to the LSBs (Least Significant Bits) of the COUNT-C. Therefore, HFN is increased by 1 when the short sequence number wraps around to 0. The adjustment of this HFN is one of the factors which causes ciphering problems to occur in related art systems, details of which will now be discussed.

Drawbacks of Related-Art SRNS Relocation Procedures

Ciphering problems are usually caused when the HFNs become out of synchronization between the RLC entities of the terminal and the RNS (or RNC) in the UTRAN. This synchronization problem is mainly attributable to the COUNT-C parameter. More specifically, as previously discussed, all ciphering parameters except COUNT-C are fixed parameters and therefore may remain synchronized throughout the connection. The short sequence number (i.e. the LSBs of the COUNT-C) is also synchronized because, for TM RLC, the CFN is known to both the terminal and the UTRAN and, for UM and AM RLC, the RLC SN is included in the PDU header and transmitted through the radio interface. For TM RLC, the long sequence number corresponding to HFN is also synchronized because the CFN is calculated from the SFN (System Frame Number) which is continuously broadcast in a cell. For UM and AM RLC, however, the HFN is sometimes out-of-synchronization due to lost or re-transmitted RLC PDUs. This condition is explained in greater detail below.

Under normal conditions, the HFN is never exchanged and is locally managed by the terminal and the UTRAN. The locally managed HFNs may become out-of-synchronization for UM and AM RLC modes when RLC PDUs are lost or re-transmitted, as previously mentioned. If the HFN values managed by the terminal and the UTRAN become different, then the MASKs used in the terminal and the UTRAN also become different. As a result, the ciphered data cannot be deciphered in the receiver. Thus, once the HFNs become out-of-synchronization, data transmission cannot be successfully performed until the HFNs are synchronized.

The problems in the related-art SRNS relocation procedure are caused when this ciphering problem (i.e., unsynchronized HFNs) arises in UM and AM RLC operation. In FIG. 7, these problems affect steps 7 and 8. The manner in which the steps are adversely affected will now be described in detail. (Note that step 1 has no ciphering problem since the RRC message is transmitted using TM RLC).

Problems in Step 7.

In Case I (UE not involved) and Case II (UE involved), RRC messages are transmitted to the terminal using an appropriate serving radio bearer SRB. The RLC layer in the target RNC is newly generated and the status variables and timers are initialized. As a result of this initialization, the sequence number of the RLC PDU transmitted from the RLC layer in the target RNC to the terminal is initialized to 0 (zero). The terminal RLC layer, however, may be expecting the next PDU it receives to have a different sequence number. The possible problems in transmitting RRC messages resulting from this discrepancy will be described for each of these cases.

(1) UTRAN Mobility Information Message is Transmitted Through SRB1: In this case, the relocation procedure is performed during a UM RLC mode of operation. During this procedure, the UTRAN HFN is transferred from the source RNC to the target RNC and the target RNC transmits a protocol data unit (PDU) including the UTRAN HFN to the terminal. As previously explained, however, before the PDU is transmitted its sequence number is initialized to some number, e.g., zero. In most cases, this initialized value does not correspond to the sequence number of the next PDU the terminal expects to receive. As a result, when the terminal receives the PDU with its initialized sequence number, it concludes that one or more PDUs have not been successfully received, e.g., there are some missing PDUs. The terminal will therefore operate based on the assumption that an RLC sequence-number wrap around condition has occurred. When this condition is detected, the transmitter RLC will alter its ciphering information by incrementing its HFN parameter by one. This presents the following problem.

When the relocation procedure caused the serving RNS (SRNS) to change from the source RNC to the target RNC, the value of the HFN parameter was not changed. As a result, the target RNC will transmit PDUs with the original UTRAN HFN value. The terminal, however, will attempt to decipher these PDUs with the newly incremented HFN value. Because the terminal and UTRAN are operating based on different HFN values, the terminal and UTRAN (target RNC) are considered to be out of synchronization and the transmitter will not be able to decipher any PDUs from the UTRAN.

(2) UTRAN Mobility Information Message is Transmitted Through SRB2: In this case, the relocation procedure is performed during AM RLC mode of operation, and the terminal RLC only accepts PDUs having sequence numbers that fall within a valid range, which is maintained for purposes of efficient management of data re-transmissions. This valid range is defined by the size and position of a receiving window maintained by the terminal receiver during AM operation. When the terminal receives RLC PDUs which lie outside of the receiving window, the terminal just discards these PDUs.

During the relocation procedure, the next PDU transmitted to the terminal has a sequence number which has been initialized to zero. If this sequence number lies outside of the receiving window of the transmitter, it will be immediately discarded. However, even if the sequence number lies within the range of the receiving window, the PDU will not be able to be deciphered by the transmitter. This is because the next sequence number the terminal expects to receive does not correspond to the sequence number of the received PDU. The terminal will therefore conclude that missing PDUs exist and that a wrap-around condition with respect to PDU sequence numbers has occurred. When this condition is detected, the transmitter RLC will alter its ciphering information by incrementing its HFN parameter by one, thereby causing the HFN of the terminal and the HFN of the UTRAN to be different. This discrepancy will prevent the terminal from deciphering any data from the UTRAN (3) Cell/URA Update Confirm Message is transmitted through SRB1: In this case, the relocation procedure is performed during UM RLC operation. The same problem occurs as in (1) above, i.e., the RRC messages transmitted from the target RNC in step 7 cannot be deciphered by the terminal because of a discrepancy in HFN values which occurred as a result of the initialization of the sequence number of the next PDU transmitted from the UTRAN.

In all the above cases, the terminal and UTRAN will not be able to communicate after SRNS relocation has been performed unless and until the out-of-synchronization problem with regard to their HFNs is resolved. Complications which arise in connection with Step 8 will now be discussed.

Problems in Step 8.

In Case I (UE not involved) and Case II (UE involved), the terminal transmits a UTRAN Mobility Information Confirm message through SRB2 when the relocation procedure is performed during the AM RLC mode of operation. The similar problems occur as indicated in (2) above for step 7. The difference is that the roles are reversed, i.e., the transmitter is the terminal RLC and the receiver is the target RNC RLC.

In view of the foregoing considerations, it is clear that there is a need for an improved system and method for performing an SRNS relocation procedure in a wireless communications system, and more specifically one which efficiently resolves deciphering discrepancies that arise between transmitting and receiving entities as a result of an initialization performed during the relocation procedure.

SUMMARY OF THE INVENTION

An object of the invention is to solve at least the above problems and/or disadvantages and to provide at least the advantages described hereinafter.

Another object of the present invention is to provide a system and method for performing an SRNS relocation procedure in a wireless communications system in a manner which increases transmission efficiency compared with other systems which have been proposed.

Another object of the present invention is to achieve the aforementioned object by efficiently resolving deciphering discrepancies that arise between transmitting and receiving entities when an initialization step is performed in the relocation procedure.

Another object of the present invention is to resolve these deciphering discrepancies by ensuring that the transmitting and receiving entities operate using the same HFN parameter during or immediately after the relocation procedure is performed. By coordinating this information, the out-of-synchronization problem that other proposed systems experience is resolved. In accordance with one embodiment, the transmitting entity may be a UTRAN RNC and the receiving entity may be a user terminal, otherwise known as user equipment in the standards developed by the 3GPP, including but not limited to the universal mobile telecommunications system (UMTS) which is one form of IMT-2000 system. In another embodiment, the transmitting entity may be the user terminal and the receiving entity may be a UTRAN RNC. The present invention is also advantageous because it may be applied to UM and AM modes of RLC operation.

The foregoing and other objects of the invention are achieved by providing a system and method which performs SRNS relocation in a mobile communication system, and more specifically in a serving radio network sub-system which includes a radio network controller for managing a radio resource allocated to a terminal in the mobile communication system. In accordance with one embodiment, the method includes reserving a requiring resource in a serving radio network sub-system relocation on a network; transmitting a radio resource control message corresponding to the serving radio network sub-system relocation to the terminal in order that the radio network controller communicates the terminal, and transmitting a response radio resource control message corresponding to the serving radio network sub-system relocation to the radio network controller to which the radio resource control message is transmitted.

The radio network controller transmits data by setting a corresponding radio link layer and adjusting a frame number used for ciphering so that the terminal successfully restores ciphered data before the radio network controller transmits the corresponding radio resource control message to the terminal. The frame number is increased by 1 more than a value used at a present time, and a unit data of the corresponding radio link layer is transmitted by ciphering. A radio resource control layer may transmit a command for setting a link control layer and the frame number to the corresponding radio link control layer.

In addition to these steps, an original radio network controller may perform the role of a serving radio network controller before the serving radio network sub-system relocation transfers status information of a radio link control layer used at a present time to a target radio network controller. This is performed so that the terminal successfully receives a serving radio resource control message before the target radio network controller transmits a radio resource control message corresponding to the serving radio network sub-system relocation to the terminal. The transferred status information may include a parameter corresponding to the radio link control layer operated in an unacknowledged mode. Also, a first sequence number of a unit data of the radio link control layer including the radio resource control message corresponding to the serving radio network sub-system relocation transferred from the target radio network controller to the terminal is transmitted by being set with a VT(US) of a parameter corresponding the radio link control layer operated in the unacknowledged mode.

In accordance with another embodiment, the transferred status information includes a parameter or data corresponding to the radio link control layer operated in an acknowledged mode. Also, a first sequence number of unit data of the radio link control layer including the radio resource control message corresponding to the serving radio network sub-system relocation transferred from the target radio network controller to the terminal is transmitted by being set with a VT(US) of a parameter corresponding the radio link control layer operated in the unacknowledged mode. The radio link control layer of the target radio network controller may transmit unit data of the radio link control layer being transmitting which is transferred from the original radio network controller.

The original radio network controller finishes transmission of the radio resource control message being transmitting or being waited for being transmitted prior to transferring parameter corresponding to the radio link control layer operated in the acknowledged mode.

The radio link control layer of the target radio network controller transmits a receiving window movement command to a radio link control layer of the terminal in order to prevent a transmission of an unit data of the radio link control layer having a sequence number below a sequence number of VT-1. The radio resource control layer of the target radio network controller indicates the radio link control layer to start the receiving window movement command in order to transmit the receiving window movement command.

In the foregoing embodiments, the radio resource control layer transfers the parameter or the data transferred from the original radio network controller to the radio link control layer. Also, a value of a field of a length indicator of the unit data of a first radio link control layer including the radio resource control message transmitted from the target radio network controller to the terminal after the serving radio network sub-system relocation indicates an information that the unit data of the corresponding radio link control includes the radio resource control message from a first portion thereof.

In addition to these features, any one or more of the embodiments of the present invention may include an initialization step for the radio link control layer, where a status variable is initialized and a frame number is synchronized between the radio link control layer of the terminal and the radio link control layer of the target radio network controller. This will enable the terminal to successfully receive the radio resource control message before the target radio network controller transmits the radio resource control message corresponding to the serving radio network sub-system relocation to the terminal. The target radio network controller may transmit an initial unit data to the radio link control layer of the terminal as a command performing an initialization of the radio link control.

Further, the radio resource control layer of the target radio network controller may transfer an initialization start command to the radio link control layer in order that the radio link control layer of the target radio controller start in an initialization process of the radio link control layer.

The radio link control layers of the target radio network controller and the terminal are preferably set in order to allow the target radio network controller to successfully receive the corresponding radio resource control message before the terminal transmits the radio resource control message corresponding the serving radio network sub-system relocation to the target radio network controller. Here, a frame number may be synchronized during setting of the radio link control layers of the target radio network controller and the terminal. A setting of the frame number may be transferred from an upper layer, and may be performed by increasing frame numbers used in the terminal and the target radio network controller by 1 (one). Alternatively, setting of the frame numbers used in the radio link control layer of the terminal and the radio link control layer of the target radio network controller may be performed by increasing a larger value among an uplink frame number and a downlink frame number used in the radio link control layer of the terminal and the radio link control layer of the target radio network controller by 1 (one) based on the larger value.

The radio resource control layers of the terminal and the target radio network controller transmit respective command for a setting/resetting of corresponding radio link control layers.

A setting/resetting of a signaling radio bearer and a radio bearer in the terminal and the target radio network controller are performed after a process that the terminal transmits a response radio resource control message corresponding to the serving radio network sub-system relocation to the target radio network controller. Here, a frame number in the setting/resetting of the signaling radio bearer and the radio bearer between the terminal and the target radio network controller is set to a frame number initial value included in the response radio resource control message corresponding to the serving radio network sub-system relocation transmitted from the terminal to the target radio network controller. The frame number initial value included in the radio resource control message may correspond to an initial value stored in a ciphering module of the terminal defined in a Universal Mobile Telecommunications System standard of asynchronous IMT2000 system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 shows a structure of a Protocol Data Unit (PDU) used in a Radio Link Control (RLC) layer of the radio interface protocol of FIG. 2;

FIG. 4 is an exemplary snapshot of the state of an AM RLC buffer;

DETAILED DESCRIPTION OF PREFERRED EMBODIMENTS

The present invention is a system and method for performing an SRNS relocation procedure in a wireless communications system. The relocation procedure is performed in a manner which prevents an out-of-synchronization condition from arising between transmitting and receiving entities. In one embodiment, the invention synchronizes ciphering information in the transmitting and receiving entities. By taking these steps, the present invention improves the reliability and efficiency of communications in the system. While the invention is suitable for use in a UMTS system, those skilled in the art can appreciate that the method may be performed in communications systems which adhere to other standards and/or protocols.

The method of the present invention controls the manner in which information is transmitted between a receiver and transmitter, and is especially well suited for use in the non-limiting application of where the transmitter is a UTRAN and the receiver is a user terminal (or user equipment as it is called by the 3GPP initiative). When applied in this manner, the steps of the method may differ depending upon the type of SRNS relocation to be performed and the mode of operation of the RLC layers of the UTRAN and user terminal.

The SRNS relocation procedure may be classified into two cases. In Case I, SRNS relocation is initiated by the core or another network and the terminal is not informed that relocation is performed until the relocation procedure is terminated. Case I may therefore be characterized as corresponding to the situation where the terminal is not involved in making the decision to perform relocation. In Case II, SRNS relocation is initiated by the user terminal. The terminal is therefore aware that relocation is being performed at the very start of the procedure. Case II may therefore be characterized as corresponding to the situation where the terminal is involved in making the decision to perform SRNS relocation.

Figure 1:
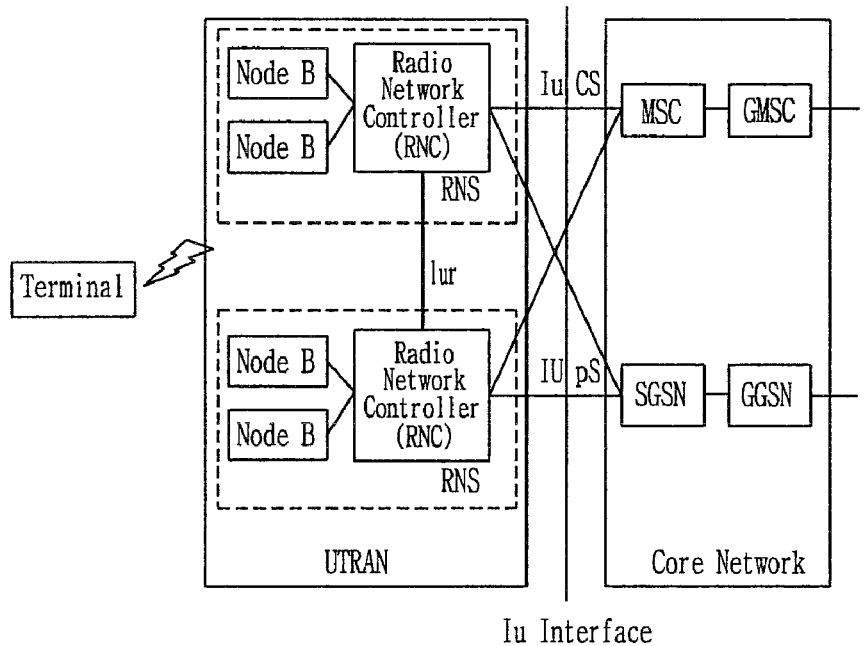
FIG. 1 shows a network architecture of a Universal Mobile Telecommunications System (UMTS)
Figure 2:
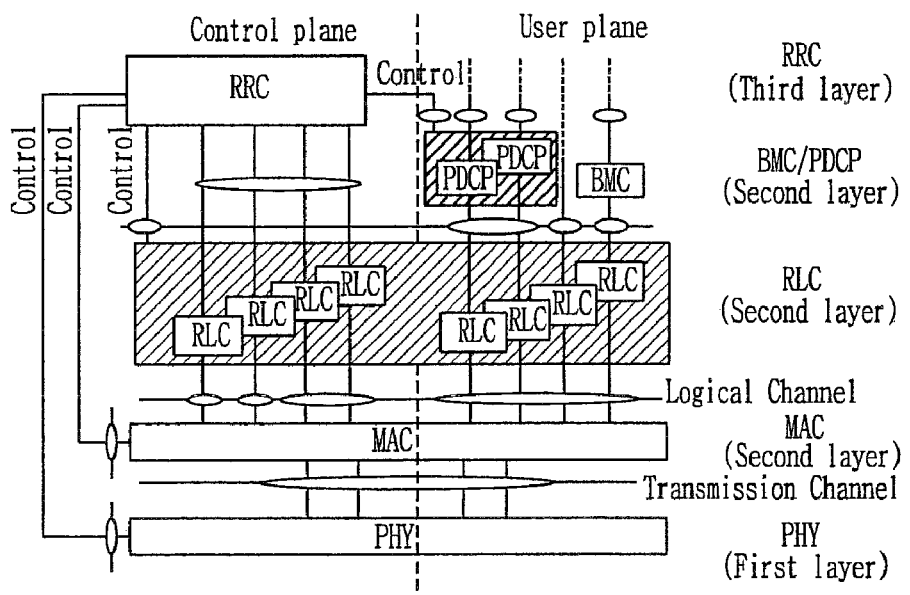
FIG. 2 shows a structure of a radio interface protocol which may be implemented within the UMTS system.
Figure 5:
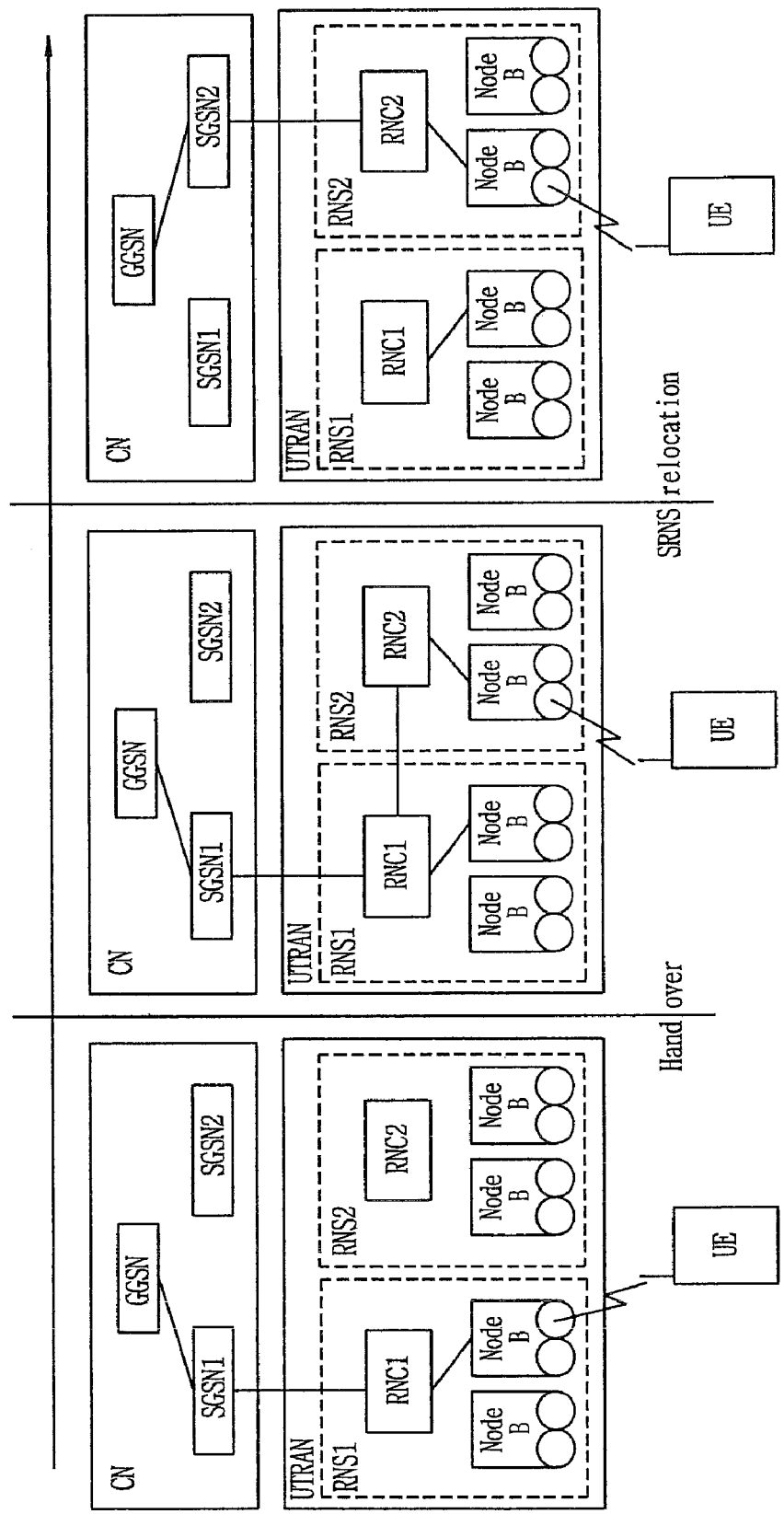
FIG. 5 is a diagram illustrating the concept of an SRNS Relocation procedure.
Figure 6:
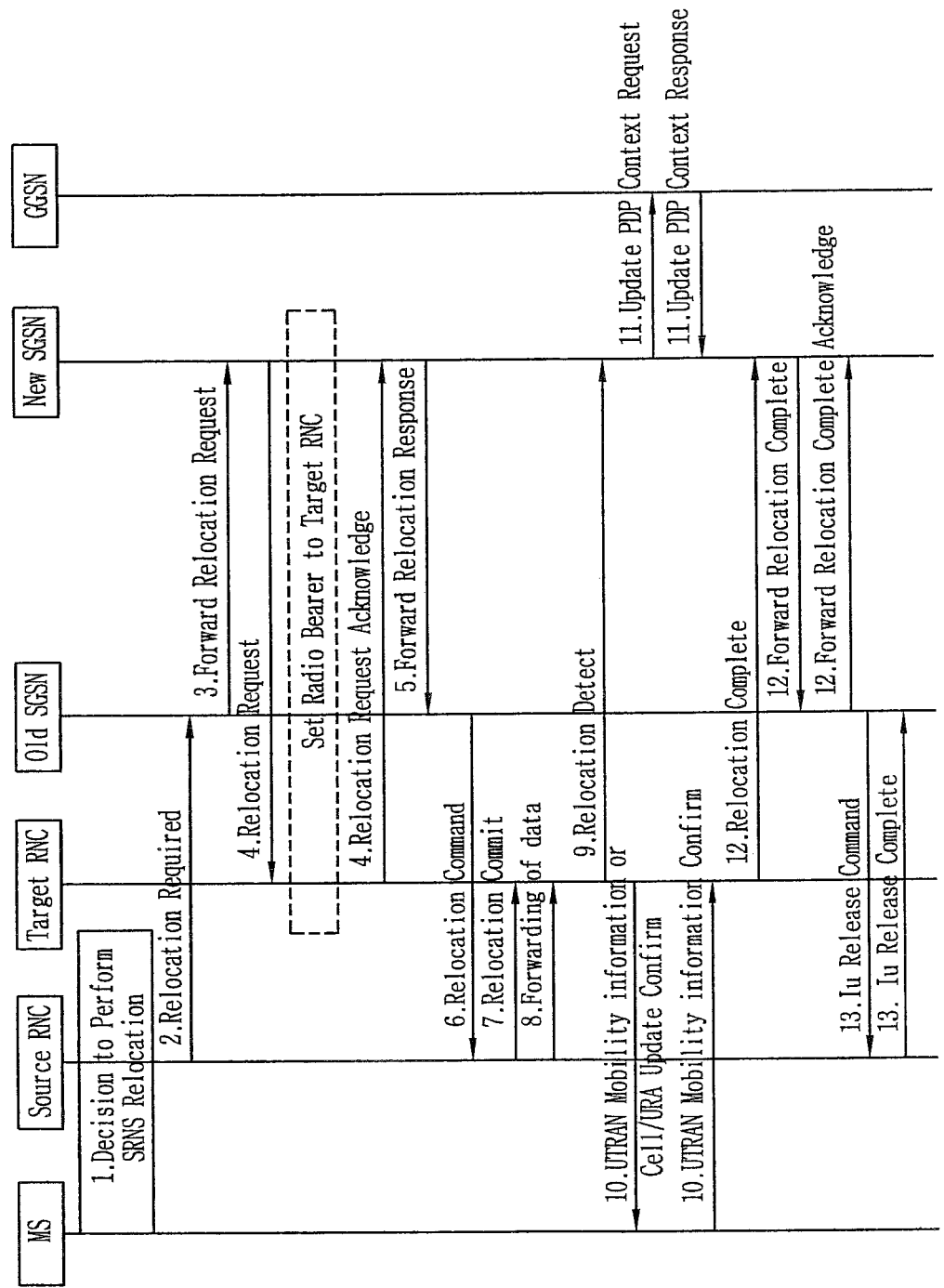
FIG. 6 is an SRNS Relocation signaling procedure in UMTS system.
Figure 7:
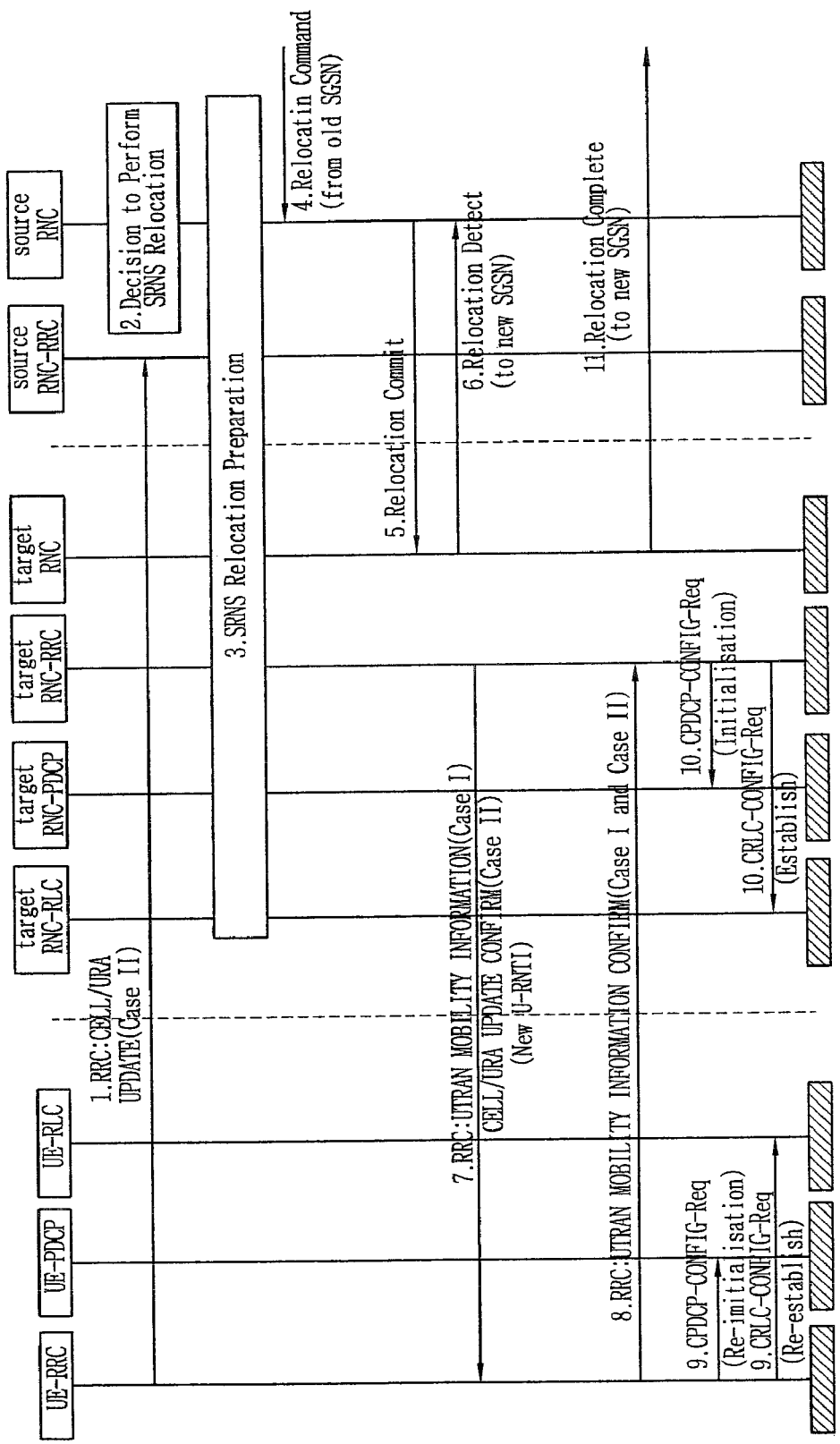
FIG. 7 is an SRNS Relocation signaling procedure of a related-art system which includes a UMTS Terrestrial Radio Access Network (UTRAN)
Figure 8:
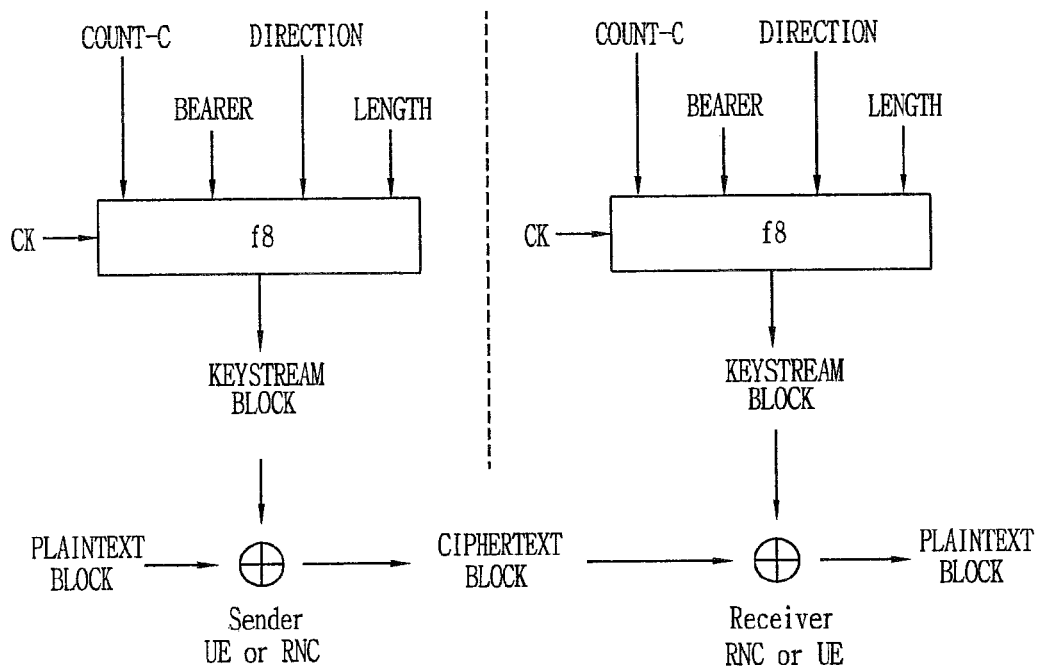
FIG. 8 shows a ciphering process performed in the radio interface protocol of FIG. 2.
Figure 9:
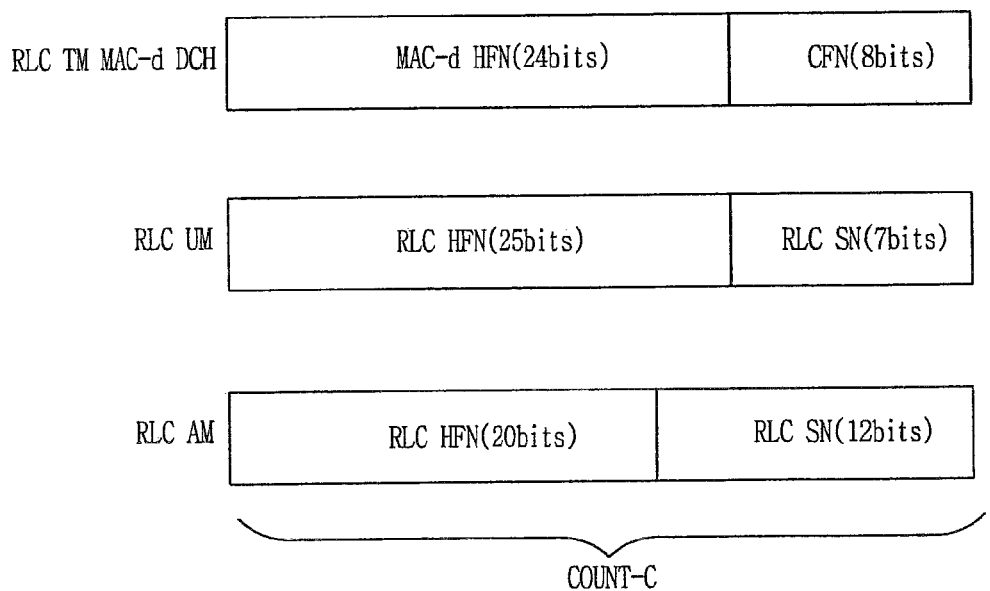
FIG. 9 is the structure of COUNT-C parameter used within RLC mode.

The various embodiments of the present invention method may be initially understood by distinguishing them from the related-art method of FIG. 7. While the present invention may share some of the steps in the related-art method, the following discussion makes clear that the present invention advantageously overcomes the synchronization and other problems that arise in this system. A description of the related-art system will therefore be initially be provided.

Referring to FIG. 7, an initial step of the method differs depending upon whether the SRNS relocation procedure is requested by the network (Case I) or user terminal (Case II). In Case I, the method of the present invention begins when the network decides to perform SRNS relocation, i.e., when the UTRAN decides to switch from one RNS (or a source RNC) to another RNS (or a target RNC) for purposes of communication with the user terminal. (Step 2). The network may decide to perform an SRNS relocation based on any one of a variety of factors. For example, relocation may be desirable to reduce the amount of traffic being handled by the source RNC, to locate a shorter or more efficient communications path for purposes of handling a call with the user terminal, or other reasons which may be understood by those skilled in the art.

In Case II, the method of the present invention begins when the user terminal transmits an RRC message in the form of a Cell/URA Update message to the source RNC. (Step 1). This message includes a request for changing the SRNS of the UTRAN. Such a message may be transmitted, for example, when the user terminal moves to a new cell within the wireless system, e.g., when a handoff operation is imminent or required. At this time, the network may decide whether to favorably respond by satisfying the request or may immediately respond.

The second through fifth steps are commonly performed for Cases I and II. In the second step, relocation preparation is performed. (Step 3). This involves forwarding relevant parameters for communicating with the user terminal from the source RNC to the target RNC through an RRC information container. This container includes, for example, ciphering information (e.g., downlink HFN and uplink HFN parameters) for signaling radio bearers, as well as radio resources including new RABs for purposes of changing the serving RNS from the source RNC to the target RNC. The type of radio bearers reserved in this step depends on whether AM or UM RLC mode is being supported in the UTRAN. If AM mode is supported, one or more lossless radio bearers are reserved so that lossless SRNS relocation may be performed. If UM mode is supported, one or more seamless radio bearers are reserved so that seamless SRNS relocation may be performed.

The third step includes receiving an RANAP Relocation Command from the core network, and more specifically from an existing SGSN in the core network. (Step 4). The existing SGSN may be referred to as the "old SGSN," and if relocation results in requiring a change of SGSNs (which may not always be the case) a "new SGSN" will be assigned after relocation. The Relocation Command informs the source RNC of the RABs to be released and the RABs that are subject to data forwarding in connection with the relocation procedure. Lossless SRNC (performed for AM RLC operation) may be configured for RABs subject to data forwarding. The PDCP layer supports PDCP sequence numbering when lossless SRNS relocation is supported.

The fourth step includes transmitting a Relocation Commit message from the source RNC to the target RNC. (Step 5). In this step, for the affected radio bearers, the source RLC is stopped and the PDCP transmission sequence numbers are retrieved by the RRC. The PDCP of the source RNC transfers the sequence numbers and other information for communicating with the user terminal to the target RNC.

The fifth step includes transmitting an RANAP Relocation Detect message from the target RNC to the source RNC. (Step 6). When this message is received, the target RNC becomes the serving RNC. A corresponding change from the old SGSN to the new SGSN may be performed at this time. After these steps, the relocation has occurred.

The sixth step includes transmitting an RRC message from the target RNC to the user terminal, and more specifically to the RRC layer of the user terminal. In Case I, the RRC message is in the form of a UTRAN Mobility Information message. In Case II, the RRC message is in the form of a Cell/URA Update Confirm message. In each of these messages, a new U-RNTI is included to inform the user terminal that an SRNS relocation procedure was performed.

A seventh step includes calculating a START value in the user terminal in response to downlink counter synchronization information. The START value is then transmitted from the user terminal to the RRC layer of the target RNC in an RRC message called a UTRAN Mobility Information Confirm message. (Step 7).

An eighth step includes establishing RLC entities in the target RNC based on the START value included in the UTRAN Mobility Information Confirm message. In the meantime, the user terminal may also reestablish its RLC entities with the transmitted START value. (Step 8).

The foregoing description may serve as a framework for the approach taken by the method of the present invention for overcoming the out-of-synchronization problem that adversely affects the performance of the related-art method of FIG. 7. This problem occurs in the sixth step discussed above.

In this step, the target RNC transmits an RRC message either on SRB1 or SRB2 depending upon the case and the mode of operation of the RLC entities. More specifically, either a UTRAN Mobility Information message is sent on an AM/DCCH (SRB2) or UM/DCCH (SRB1), or a Cell URA Update Confirm message is sent on UM/DCCH (SRB1). Although the Cell/URA Update Confirm message can use UM/CCCH (SRBO), SRNS relocation policy (if SRNS is relocated before the Cell/URA Update confirmation is sent, a DCCH should be used to allow ciphering of the message contents) may require that this message should not use SRBO in case of SRNS relocation.

When the steps shown in FIG. 7 are performed, out-of-synchronization problems arise between the user terminal and UTRAN which prevent communications from being performed. Some of these problems occurs as follows.

Problem 1: CL RRC Message is Sent on SRB1 (LJM/DCCH). Before SRNS relocation, the source RNC may be communicating PDUs with the user terminal based on synchronized deciphering information. For example, the source RNC may transmit PDUs based on a downlink HFN parameter=X and a transmission sequence number corresponding to a state variable VT(US)=50 for UM mode of operation. Similarly, the user terminal may transmit PDUs based on an uplink HFN=X and a VR(US)=50. Because the deciphering information and transmission sequence numbers are synchronized, the user terminal and source RNC can communicate without problems. However, when SRNS relocation occurs, since the HFN value is transferred from the source to the target RNC without any additional information (e.g., without transmission sequence number information in the form of one or more of state variables VT(US) or VR(US)), the target RNC establishes a UM RLC entity with the same deciphering information used by the source RNC (i.e., DL HFN=X) but with state variable VT(US) set to a newly initialized value, e.g., zero.

Accordingly, when the target RNC sends an RRC message to the user terminal, the user terminal will in most cases recognize the transmission sequence number in the RRC message as corresponding to an out-of-sequence number, because it does not include the sequence number that follows the last PDU transmitted by the source RNC. When this occurs (e.g., when the user terminal detects that the received RRC message has a serial number SN=0), it will conclude that a new PDU has been received and more specifically that PDUs having serial numbers of between 50 and 127 are missing. As a result, the user terminal will increase its HFN to a value of X+1 for purposes of deciphering future PDUs. However, the target RNC will continue to transmit PDUs based on HFN=X. Because there is a discrepancy in the deciphering information used by the user terminal and target RNC, the user terminal will not be able to decipher and thus successfully receive the PDUs transmitted from the target RNC. This means that the user terminal cannot receive the RRC message.

Problem 2: DL RRC Message is Sent on SRB2 (AM/DCCH). Before SRNS relocation, assume that DL HFN=X and VT=3000 in the source RNC and DL HFN=X and VR(R)=3000 in the user terminal. Because the deciphering information and transmission sequence numbers are synchronized, the user terminal and source RNC can successfully communicate. However, when SRNS relocation occurs, since the HFN value is transferred from the source RNC to the target RNC without VT indicative of transmission sequence number, the target RNC will establish an AM RLC entity with DL HFN=X but with VT set to an initial value, e.g., VT=0.

When the RRC message is sent from the target RNC to the user terminal, the user terminal will discard the message if its transmission sequence number (which is zero in this case) lies outside of the range of the receiving window. However, even if the sequence number of the RRC message lies within the receiving window, the user terminal will consider it to be a new PDU, i.e., that PDUs having sequence numbers from 3000-4095 are missing. When this occurs, the user terminal sets its HFN=X+1. As a result, the deciphering information in the user terminal and target RNC are different and therefore the user terminal will not be able to receive the RRC message transmitted from the target RNC.

In both problems discussed above (SRB1 or SRB2), the user terminal in most cases cannot receive the RRC message transmitted from the target RNC. As a result, SRNS relocation fails. Of course, it is noted that there is a slim possibility that the user terminal will be able to receive the initial RRC message from the target RNC, but this can only happen when VT(US)=VR(US)=0 or VT=VR(R)=0. However, even if the initial RRC message from the target RNC is successfully received and deciphered by the user terminal, the target RNC will not be able to receive the UTAN Mobility Information Confirm RRC message transmitted from the user terminal. This message is sent on AM/DCCH (SRB2), and it cannot be received by the target RNC because VT=3000 in the user terminal but VR(R)=0 in the target RNC.

The system and method of the present invention overcomes these and other problems that arise in the related-art system as a result of synchronization and transmission sequence number mismatches. As the following embodiments will reflect, the target RNC and user terminal will be controlled to synchronize all information required in order for a successful relocation procedure to be performed. The specific embodiments will now be discussed.

The method of the present invention may be performed differently depending upon whether Case I or Case II applies. When SRNS relocation is requested by the network (Case I), the sixth step includes synchronizing ciphering information in the target RNC to ciphering information that is expected to be used in the user terminal. This synchronization may be performed in view of the following realization.

During the relocation procedure, RLC PDUs transmitted from the target RNC to the user terminal will have initialized values. For example, the first PDU transmitted will be given an initial transmission sequence number such as zero. On the user terminal side, the RLC layer receives PDUs and orders them based on transmission sequence number. Since the user terminal was communicating with the source RNC prior to relocation, the next PDU the RLC of the user terminal will expect to receive is one whose transmission sequence number consecutively follows the transmission sequence number of the last-received PDU. The first PDU transmitted from the target RNC in the UTRAN, however, will have an initialized sequence number and thus in all probability will not correspond to the expected number.

When this occurs once or a predetermined number of times, the user terminal RLC will conclude that a wrap-around condition has occurred. When such a condition is detected, the RLC of the user terminal will adjust its deciphering information by changing its HFN parameter to a new value. This change may involve incrementing the HFN parameter by 1.

In the related-art method of FIG. 7, the target RNC did not compensate for this change in deciphering information in the user terminal. Instead, PDUs were ciphered using ciphering information (i.e., the HFN parameter) included in the RRC information container sent from the source RNC to the target RNC. As a result, PDUs transmitted from the target RNC could not be deciphered by the user terminal and a stall in communications occurred.

The present invention overcomes this problem by taking one of several approaches. On approach involves adjusting ciphering information in the target RNC received from the source RNC. This adjustment ensures that the target RNC ciphers PDUs with the same HFN parameter the user terminal will use during deciphering. Since UTRAN management software is programmed to know how the user terminal will adjust its HFN parameter when a PDU having an out-of-sequence transmission sequence number is received, the target RNC may cipher the PDUs to be sent to the user terminal using the same adjusted HFN parameter. The nature of the adjustment performed by the present invention depends on whether Case I or II is being observed and whether the RLCs of the user terminal and target RNCs are operating in AM or UM mode. The following situations apply.

A. Downlink RRC Message Sent on SRB1 (UM/DCCH).

In this case, the RLCs of the target RNC and user terminal are operating in UM mode. The target RNC sends an RRC message on a serving radio beater SRB1 (which corresponds to a UM DCCH channel) to the user terminal. The following situations apply.

A.1. Target RNC Establishes SRB1 and Increments DL HFN.

Figure 10:
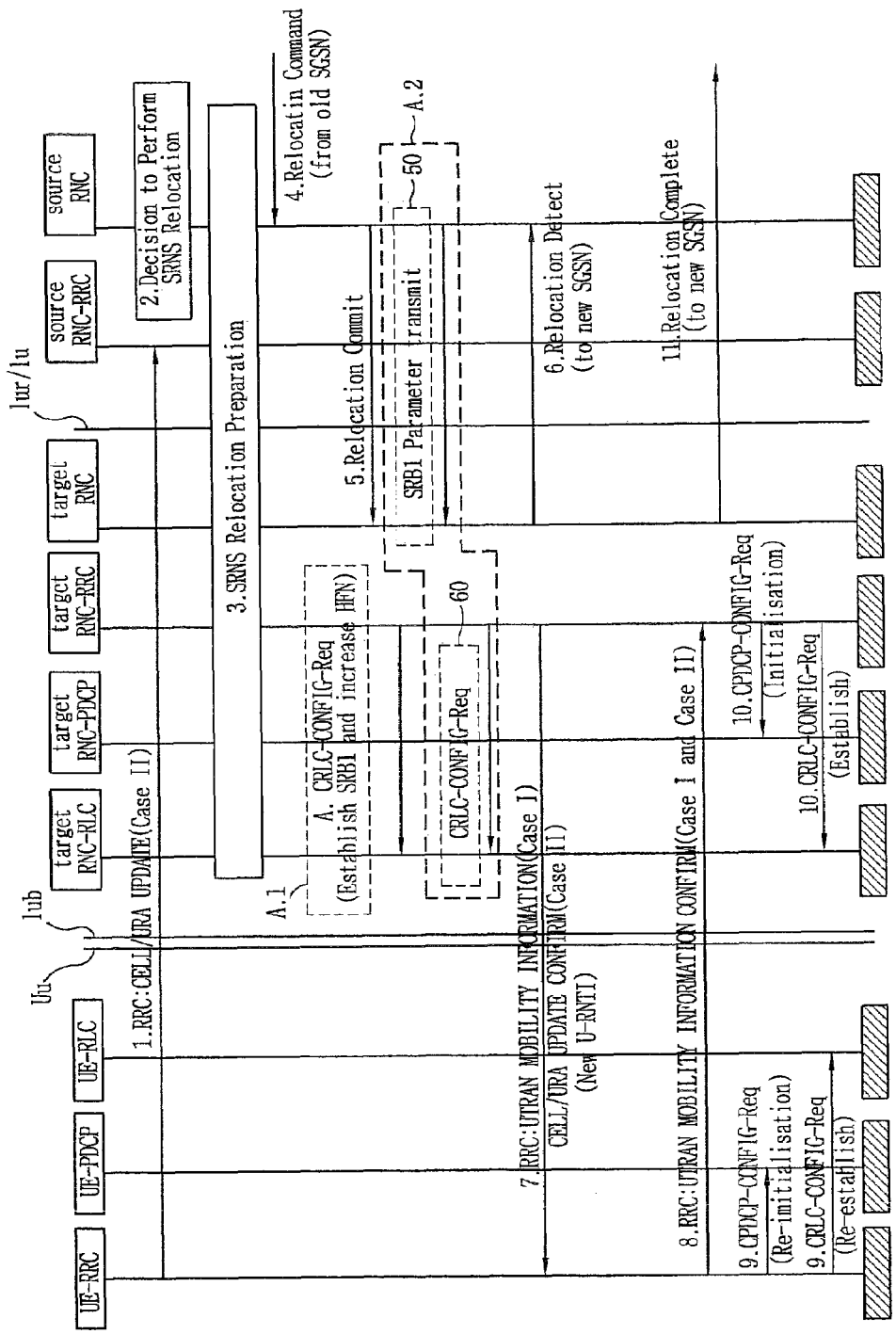
FIG. 10 is a flow diagram showing steps included in a series of embodiments of the method of the present invention identified as A1 and A2 for performing an SRNS relocation procedure.

Referring to FIG. 10, the target RNC receives an RRC information container from the source RNC. The container includes ciphering information which preferably includes an HFN parameter which the source RNC was using to communicate with the user terminal. When the RRC information container is received, the target RNC increments the HFN parameter and establishes a new SRB1. Because the target RNC has foreknowledge of the way in which the user terminal changes its HFN parameter when a wrap-around condition occurs or when an out-of-sequence PDU is received, the target RNC increments its HFN parameter in an identical manner. As a result, the PDUs generated by the target RNC will be ciphered in a way which is decipherable by the user terminal.

Once the PDUs have been generated, they are transmitted from a UM RLC of the target RNC to the user terminal. The first PDU transmitted includes an initial transmission sequence number, e.g., SN=0. When the user terminal receives the PDUs, the user terminal detects that the first PDU has an out-of-sequence transmission sequence number. The user terminal may perform this detection function by extracting state variable VR(US) from the first PDU. Since this state variable provides an indication of the transmission sequence number that corresponds to this PDU, a wrap-around or out-of-sequence condition may be detected. For example, in the case where VR(US) has values from 0 to 127, the user terminal may determine that PDUs having the value of the VR(US) in the received PDU to VR number 127 are missing.

When this condition is detected, the user terminal will adjust its HFN parameter, for example, by incrementing this parameter by 1. Since the PDUs transmitted from the target RNC were generated and transmitted in accordance with this same HFN parameter, the PDUs may be deciphered and communications may take place in spite of the relocation procedure. By synchronizing the ciphering information in the user terminal and target RNC, the present invention advantageously overcomes the out-of-synchronization problem that occurs in the related-art system of FIG. 7.

An optional but desirable step involves including a data start indicator (which may be referred to as Special L1) in one or more PDUs transmitted from the target RNC to the user terminal. In accordance with the present invention, the data start indicator may be incorporated into the PDUs transmitted by the target RNC over a UM DCCH channel. The inclusion of this indicator is advantageous. For example, if the user terminal receives a PDU from the target RNC without the data start indicator, the user terminal may consider the PDU to be part of a previous SDU and may just discard it. When received by the user terminal, the data start indicator will be interpreted to indicate that the PDU to which it is attached is not part of a previous SDU. Including this indicator will therefore ensure that PDUs received from the target RNC will not be discarded. In order to maximize transmission efficiency, the first PDU transmitted from the target RNC (i.e., the PDU having a transmission sequence number SN=0) preferably includes the Special L1 indicator.

A.2. Source RNC Transfers VT(JS) to Target RNC.

This approach differs from the approach in A.1. in that instead of incrementing its HFN parameter, the first PDU transmitted from the target RNC to the user terminal contains the next transmission sequence number which the user terminal expects to receive. Thus, the HFN parameter used by the target RNC and user terminal remains synchronized and therefore data communications may be performed. A more detailed description of this approach will now be provided.

In an initial step, the source RNC delivers an RRC information container 50 that includes state variable VT(US) of serving radio bearer SRB1 to the target RNC. State variable VT(US) is indicative of a transmission sequence number related to the transmission sequence number of the last or one of the last PDUs transmitted from the source RNC to the user terminal. The target RNC uses state variable VT(US) as a basis for transmitting its first PDU 60 to the user terminal. For example, if VT(US) corresponds to the last sequence number transmitted, the target RNC may increment the transmission sequence number corresponding to VT(US) by one and then transmit the first PDU containing this value. When the user terminal receives this PDU, it will detect that this PDU is has the next-in-sequence number that it expected and thus no wrap-around or missing PDU condition will be detected. As a result, the user terminal will not increment its HFN value as in the previous case; and because the PDU was ciphered based on the same HFN value, the user terminal will be able to decipher it.

As an alternative to this approach, the VT(US) variable delivered from the source RNC to the target RNC may be the next-in-sequence number which the user equipment expects to receive. In this case, the target RNC will transmit the first PDU with the number corresponding to VT(US).

This approach may include a number of additional steps. First, a new IE (Information element) may be used in light of the addition of VT(US) of SRB1 into the RRC information container.

Second, the RLC establishment step may be modified. For example, when the RLC entity is established, all the state variables may be set to initial values (e.g., 0). As a result, it may not be possible to establish the UM RLC entity with VT(US) other than 0. In order to compensate for setting the state variables to initial values, an establish and modify procedure should be performed. That is, at first, RLC entity is established with all the state variables to be 0, at second, the state variables are modified to be desired values.

Third, a data start indicator (e.g., Start L1) should be included in the first UM PDU transmitted from the target RNC to the user terminal. If the first PDU is transmitted without this indicator and if, for example, the PDU with sequence number SN VT(US)-1 is lost, the user equipment will discard the PDU. Because the user equipment considers that the PDU contains incomplete SDU a portion of which may be contained in the former PDU. Including the data start indicator in the first PDU transmitted from the target RNC will therefore guarantee that the RRC message will be received by the user terminal.

B. Downlink RRC Message Sent on SRB2 (AM/DCCH).

In this case, the RLCs of the target RNC and user terminal are operating in AM mode. The target RNC sends an RRC message on a serving radio bearer SRB2 (which corresponds to an AM DCCH channel) to the user terminal.

B.1. Target RNC Establishes SRB2 and Initializes RLC RESET Procedure.

Figure 11:
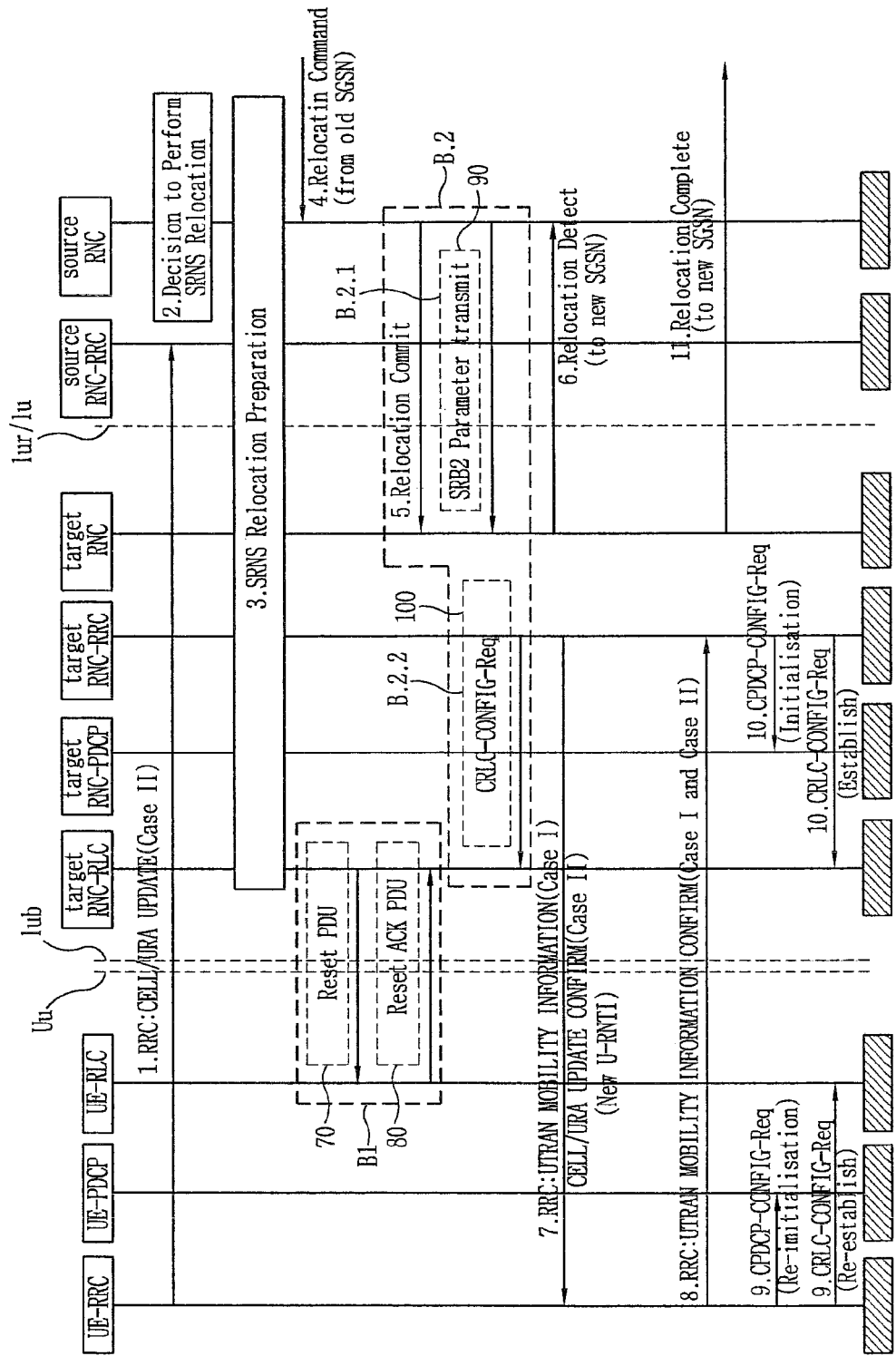
FIG. 11 is a flow diagram showing steps included in a series of embodiments of the method of the present invention identified as B1 and B2 for performing an SRNS relocation procedure.

Referring to FIG. 11, before sending the RRC message, the target RNC performs an RLC RESET operation which involves resetting the transmission sequence number and state variables to initial values. Preferably at the same time, the target RNC transmits a Reset PDU 70 to the user terminal. According to one aspect of the invention, the Reset PDU is transmitted without being ciphered and has no transmission sequence number. Consequently, the user terminal will be able to receive the Reset PDU transmitted through SRB2. Upon receiving the Reset PDU, the user terminal will reset its state variables and transmission sequence number to the same initial values set in the target RNC.

Because the Reset PDU has no transmission sequence number, the user terminal will not detect a wrap-around or out-of-sequence condition when the Reset PDU is received. Therefore, the HFN parameter in the user terminal will not be incremented. As a result, the HFN parameter which the target RNC received from the source RNC and the HFN parameter of the user terminal will be the same. And, since the state variables and transmission sequence numbers of the target RNC and user terminal have been initialized to like values, the target RNC and user terminal may successfully communication with one another. When reset is completed in the user terminal, a reset acknowledgment message Reset ACIK PDU 80 will be transmitted from the user terminal to the target RNC.

As an alternative to this embodiment, the Reset operation performed in the target RNC may cause the HFN parameter to be incremented. The Reset PDU may then be modified so that the user terminal increments its HFN value upon receipt. This may be accomplished, for example, by transmitting the Reset PDU with an initial or out-of-sequence transmission sequence number.

As a result of the foregoing steps, the HFN parameters and transmission sequence numbers of the target RNC and user terminal will be synchronized. In order to achieve this synchronization, it is preferable but not necessary to provide a new trigger for the RLC Reset procedure. More specifically, under normal operating conditions an RLC Reset procedure is performed when an RLC protocol error is detected and/or when one of three trigger conditions specified in the 3GPP specification is detected. In this embodiment of the present invention, the Reset procedure may be performed when a fourth trigger condition is detected. Referring to the specification, RLC reset procedure is performed, if one of the following triggers is detected.
1) "No_Discard after MaxDAT number of retransmissions" is configured and VT(DAT) equals the value MaxDAT;
2) VT(MRW) equals the value MaxMRW;
3) A STATUS PDU including "erroneous Sequence Number" is received;

More specifically, in accordance with an alternative embodiment of the present invention, a new C-primitive (a control message from RRC to RLC) and a new trigger in RLC protocol is used for initiating the Reset procedure.

During the Reset procedure, at least one additional step may be performed. In this step, all RLC SDUs in the user terminal and the target RNC are flushed. Though this embodiment of the invention requires some time to perform and may suffer some loss of data, it provides a clear solution to the problem of unsynchronized ciphering passwords realized by the related-art system.

B.2. Source RNC Transfers VT(S) to Target RNC.

Referring again to FIG. 11, this embodiment of the invention is similar to the embodiment discussed in A.2 above, except that a different approach is taken to account for the receiving window in the user terminal and the fact that RLC PDUs are re-transmitted in the AM operational mode. Accordingly, other than adjusting the sequence number of the RLC PDU to be transmitted to the terminal and synchronizing the HFN value, the target RNC may be required to consider data units previously transmitted to the terminal by the source RNC which were not confirmed by the user terminal. The following steps may be taken to compensate for this prospective problem.

In process step B.2.1., the source RNC transfers a message 90 containing information related to the setting of the SRB2 to the target RNC. This information includes the sequence number, state variable VT(S), and the HFN parameter used by the RLC layer of the source RNC, together with one or more RLC PDUs or an RRC message that is being re-transmitted. In process step B.2.2., the target RNC then transmits one or more PDUs 100 to be re-transmitted to the user terminal using the information transferred from the source RNC. As a result, the target RNC will transmit the PDUs in the same manner and with the same information as the source RNC.

As an example, consider the case where the source RNC transmits its HFN parameter, one or more RLC PDUs to be re-transmitted, VT(S) indicating sequence number, and VT(A) in step B1 of FIG. 11. The target RNC stores the PDUs from the source RNC after configures the RLC layer with the received parameters (Step B.2.2 in FIG. 11), and sends a UTRAN Mobility Information Message with a new PDU starting with the sequence number corresponding to VT(S). Because the target RNC can transmit data while sustaining a re-transmission buffer state of the SRB2 equal to the re-transmission buffer state of the source RNC, the user terminal can recover the re-transmitted data from the target RNC through the SRB2 channel.

In accordance with another embodiment, the source RNC delivers VT(S) to the target RNC through an RRC information container. The target RNC then establishes SRB2 (AM RLC) with the transferred values and sends an RRC message to the user terminal with those values. The user terminal operates in a different manner compared with A.2. because the AM RLC of the terminal receives PDUs that only lie within a valid range of a receiving window.

If the transmission sequence number corresponding to variable VT(S) is equal to VR(R), no problem occurs. But if VT(S) is larger than VR(R) (mainly due to the unconfirmed RLC SDUs in the source RLC), the user terminal will transmit a status PDU to the target RNC indicating that AMD PDUs from VR(R) to VT(S)-1 are missing. If appropriate action is not taken, the following problem may occur: Since VT(A)=VT(S), the target RLC finds that the received status PDU contains an "erroneous Sequence Number" and it will initiate a Reset procedure. The RLC PDUs transmitted before the Reset procedure is implemented will be lost (note that the RLC buffers may be flushed during the Reset procedure).

To guarantee successful transmission, this embodiment of the present invention delivers VT(A) in addition to VT(S) from the source RNC to the target RNC. The target RNC then transmits PDUs in SRB2 based on VT(A), VT(S) and the HFN parameter transferred from the source RNC. An establish and modify procedure may then be performed as discussed in connection with the A.2. embodiment of the invention.

The RRC message is transmitted by the AMD PDUs from VT(S). If a status PDU indicating that the user terminal did not receive the PDUs from VR(R) to VT(S)-1 is transmitted from the terminal to the target RNC, the target RNC transmits an MRW SUFI message to the user terminal in order to move the receiver window to VT(S). In order to implement these features, an additional trigger for transmitting the MRW SUFI message may be used. Consequently, a new C-primitive may be implemented along with a new trigger for performing an SDU discard with explicit signaling procedure.

In accordance with an alternative embodiment, the source RNC delivers its HFN value and VT(S) to the target RNC (Step B.2.1. in FIG. 11), and stops transmitting PDUs to the user terminal prior to SRNS relocation. In the RLC of the terminal, the processing of previous RRC messages is completed. Therefore, the first PDU received after SRNS relocation includes the UTRAN Mobility Information message having the VT(S) value.

In accordance with another embodiment, the source RNC delivers its HFN value and VT(S) to the target RNC (process B.2.1. in FIG. 11). The source RNC then transmits a command to the user terminal to instruct the RLC layer of the user terminal to move its receiving window and to not request re-transmission data. The RRC layer of the UTRAN may be used to instruct the RLC layer of the source RNC to transmit this command. Remaining steps of the method are similar to the embodiment discussed immediately above, however this embodiment may be implemented to remove RRC messages before the SRNS is relocated and for solving the re-transmission problem.

In any one or more of the B.2. embodiments discussed above, an optional step of including a data start indicator in the first PDU transmitted by the target RNC to the user terminal may be performed. The data start indicator may be the same type transmitted in the RRC message transmitted from the target RNC though SRB1 in accordance with the embodiment previously discussed.

The following example applies: the RLC PDU corresponding to the sequence number of VT(S)-1 may not be correctly received. The next RLC PDU transmitted by the target RNC right after the relocation procedure is performed may include the data start indicator B.3. Do Not Send UTRAN Mobility Information on SRB2 in Case of SRNS Relocation.

From embodiments B.1. and B.2., it is clear that the transmission of an RRC message on SRB2 may be problematic in some respects. In this B.3 embodiment, embodiment A.1 or A.2 may be implemented without the transmission of UTRAN Mobility Information on SRB2.

The embodiments discussed above are all preferably performed before or during transmission of UTRAN Mobility Information (Case I) or a Cell/URA Update Confirm message (Case II). That is, either type of message can be received by the user terminal when the A and B embodiments of the invention are performed. Even though the user terminal may receive downlink RRC messages correctly from the UTRAN, certain situations may arise which will prevent the target RNC from receiving a UTRAN Mobility Information Confirm message from the user terminal in both Cases I and II. This confirmation message may be sent in SRB2 (AM/DCCH), but because the VT(S) in the user terminal and the VR(R) in the target RNC are usually different (e.g., VT(S).noteq.0, VR(R)=0) a need may arise to synchronize the HFN and SN values in the user terminal and target RNC before the UTRAN Mobility Information Confirm message is transmitted. The following embodiments of the present invention address this problem.

C.1. User Terminal Receives Downlink RRC Message on SRB1 (UM/CCCH).

Figure 12:
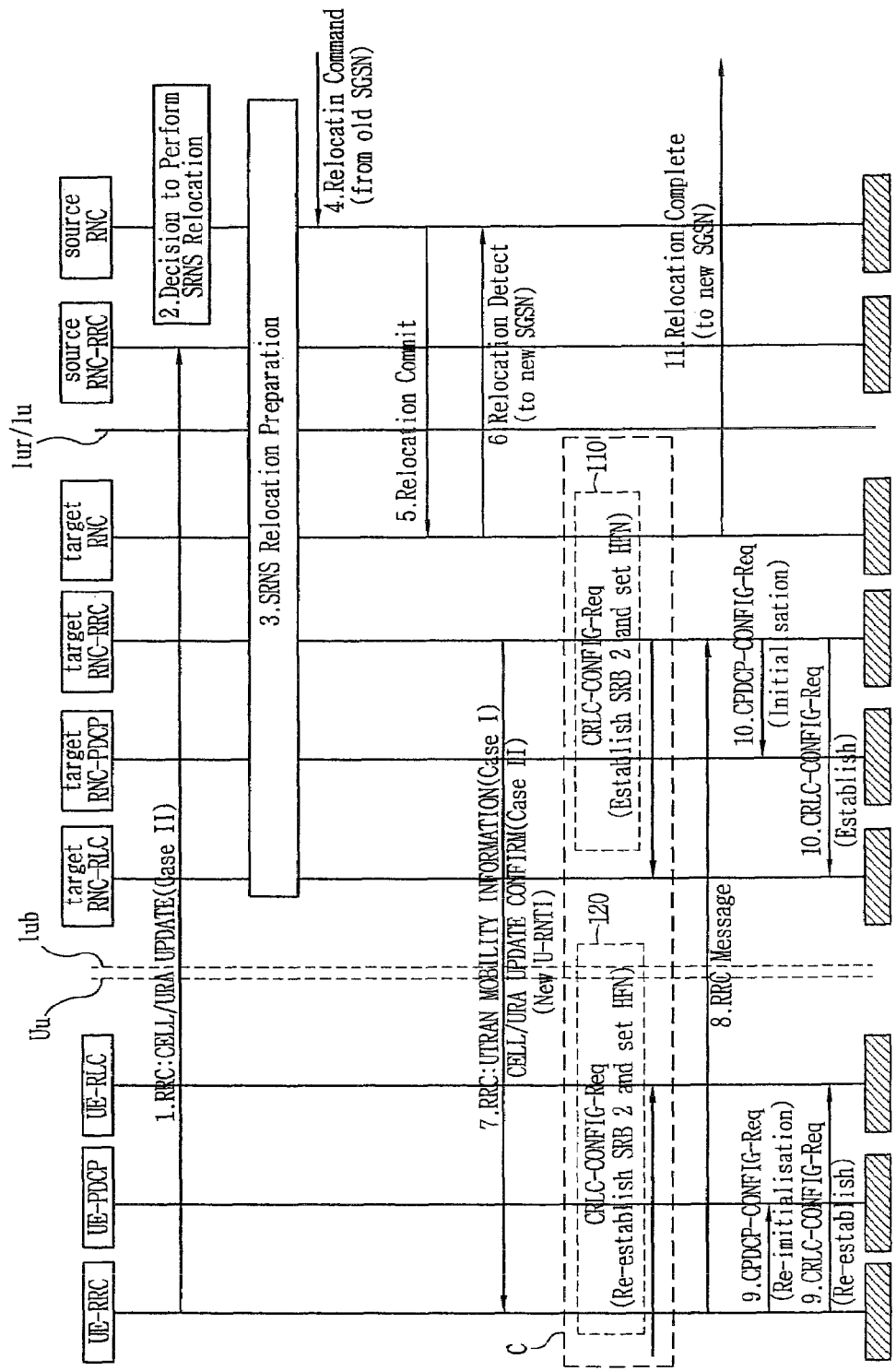
FIG. 12 is a flow diagram showing steps included in a series of embodiments of the method of the present invention identified as C1, C2, and C3 for performing an SRNS relocation procedure.

Referring to FIG. 12, in this case only the downlink HFN of SRB1 is synchronized. Before transmission of an uplink RRC message (i.e., an RRC message from the terminal to the target RNC), both the target RNC and the user terminal should perform operations 110 and 120 which respectively establish and reestablish SRB2. This includes setting both the target RNC and user terminal to the same HFN value. These steps may be accomplished by ciphering a message transmitted from the user terminal to the target RNC with an incremented HFN value (e.g., the current value of HFN+1) as is performed in the case of a combined Hard Handover and SRNS relocation. Another possible value for HFN is MAX(UL HFN of SRB2.vertline.DL HFN of SRB2)+1. Any value can be used as long as the user terminal and target RNC have the same HFN.

C.2. User Terminal Receives Downlink RRC Message on SRB2 (AM/DCCH) with a RESET Procedure.

If the user terminal receives a downlink RRC message on SRB2 and the embodiment of B.1 is performed, SRB2 does not have to be established/re-established after the message is received. During the Reset procedure, the HFN values in the user terminal and target RNC (UL and DL HFNs) are synchronized and the user terminal sends an UL RRC message to the target RRC without reestablishing SRB2. After transmission of the UL RRC message, both the user terminal and the UTRAN should establish/re-establish the SRBs (except SRB2) and RBs with the START value included in the UTRAN Mobility Information Confirm message.

C.3. User Terminal Receives Downlink RRC Message on SRB2 (AM/DCCH) with an SDU Discard with Explicit Signaling Procedure.

If the user terminal receives a DL RRC message on SRB2 and the embodiment of B.2. is performed, only the DL HFN of SRB2 is synchronized. Since the UL HFN is not synchronized, SRB2 must be established/re-established in both the user terminal and the UTRAN. The rest of the procedure is the same as in C.1. except that DL SRB1 needs to be re-established.

In one or more of the C embodiments discussed above, after transmission of the UL RRC message, both the user terminal and the UTRAN may re-establish/establish the SRBs (except SRB2) and RBs with a START value which corresponds to an initial value of the HFN. This may be accomplished by transmitting the START value in the RRC message, i.e., the UTRAN Mobility Information Confirm message. As an example, the START value may be stored in the upper 20 bits of the HFN. If the size of the HFN exceeds 20 bits, the remaining bits may be initialized to 0. The START value may correspond to a predetermined value (which may, for example, be defined in accordance with the standards developed by the 3GPP) and may be managed by a ciphering module of the terminal. The START value may be disconnected from the terminal or may be updated according to a change in the HFN value during connection.

It should be noted that the embodiment of C.1. may be applied for all cases. Though the user terminal receives a DL RRC message on SRB2 with a Reset Procedure in C.2, the reestablishment of SRB2 does not create problems in normal operation. In this case, the HFNs may be updated a maximum of two times.

In the foregoing embodiments, it may be preferable not to include an IE (Information element) "RLC re-establishment indicator (RB2, RB3, and RB4)" in the Cell Update Confirm message. If it is included, the user terminal may reestablish SRB2, SRB3, and SRB 4 and set their HFN values to a START value included in the latest transmitted Cell Update message. Since the user terminal SRB2 is reestablished with this START value, the UTRAN may not be able to receive a UTRAN Mobility Information Confirm message (UTRAN SRB2 is established with either HFN+1 or MAX(UL HFN of SRB2 DL HFN of SRB2)+1). It is further noted that these embodiments may correspond to all of the SRBs and common RBs. However, for SRB2, because the HFN value is synchronized before the UTRAN Mobility Information Confirm message is transmitted, it may not be necessary to reset the HFN value. Also, while the initial value for VT(US) has been illustratively discussed as corresponding to zero, those skilled in the art can appreciate that other initial values may be used for this or any other state variable discussed herein.

The embodiments of the present invention have been adopted in the following 3GPP Technical Specifications which are incorporated by reference herein: Technical Specification TS 25.303 v3.10.0, Technical Specification TS 25.303 v3.11.0, Technical Specification TS 25.322 v3.9.0, Technical Specification TS 25.331 v3.9.0, Technical Specification TS 25.331 v3.10.0, and all updates, revisions, and modification thereto.

A re-statement of various embodiments of the invention as indicated above may be provided as follows.

Combined Cell/URA Update and SRNS Relocation

Lossless Radio Bearers

Figure 13:
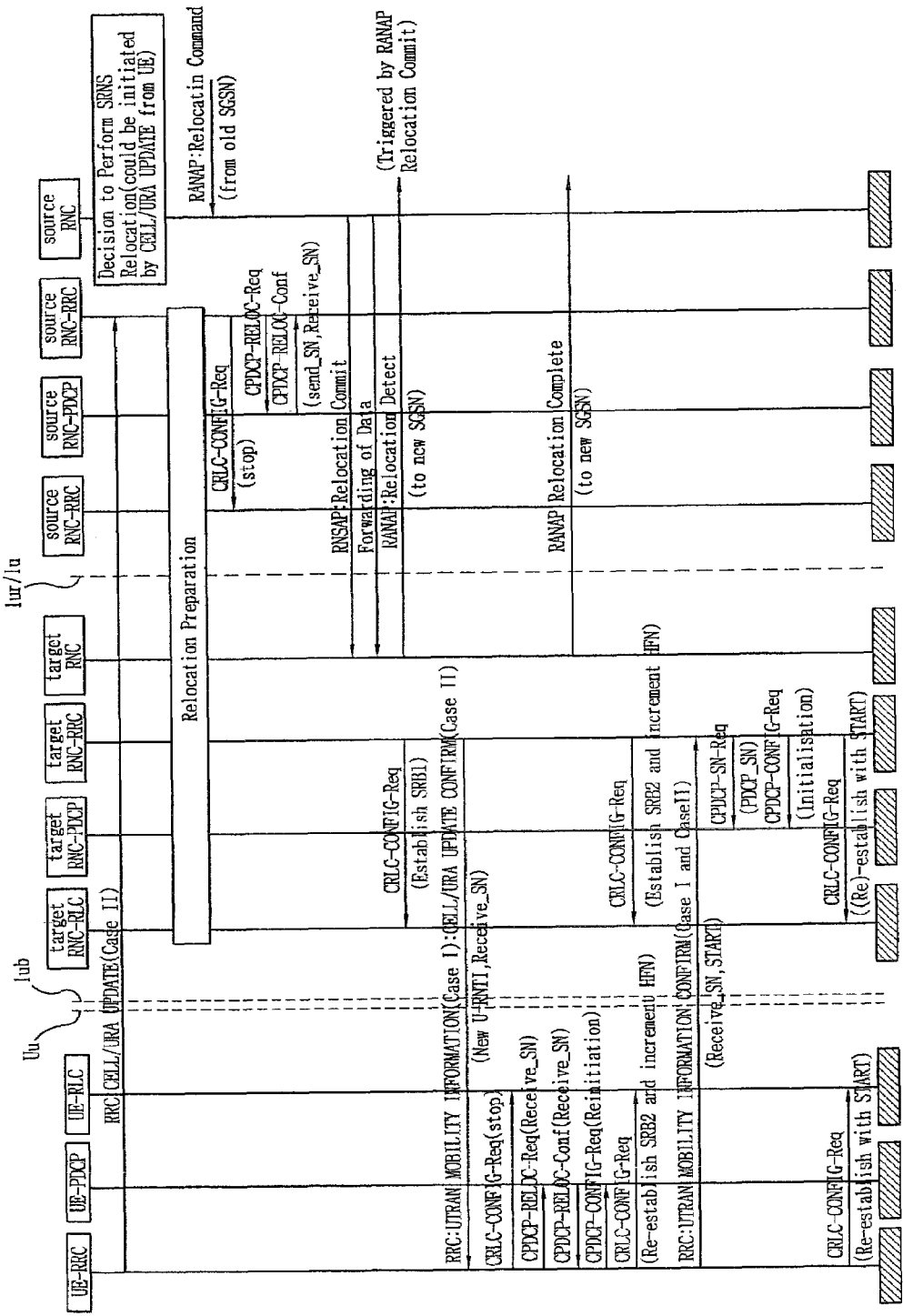
FIG. 13 is a flow diagram showing steps included in an embodiment of the method of the present invention which performs SRNS relocation for the case of lossless radio bearers.

The method of the present invention may be initiated by the source RNC deciding to perform an SRNS relocation. Steps of this method, which have been previously discussed and are re-stated below, are shown in greater detail in FIG. 13. Here, Case 1 represents the situation where the user equipment (UE) is not involved and Case 2 represents the situation wherein the UE is involved and a Combined Cell/URA update and SRNS relocation is performed.

In an initial step, an RANAP Relocation Command is received by the source RNC from the CN, indicating the RABs to be released and the RABs that are subject to data forwarding. Lossless SRNS relocation may be configured for RABs that are subject to data forwarding. The PDCP layer supports PDCP sequence numbering when lossless SRNS relocation is supported.

For the affected radio bearers, the RLC entity is stopped and the PDCP sequence numbers are retrieved by the RRC. The PDCP send and receive sequence numbers are then transferred in the RNSAP Relocation Commit message from the source to the target RNC for RABs that support lossless SRNS relocation. The target RNC becomes the serving RNC when the RANAP Relocation Detect message is sent.

The target RNC then sends a UTRAN MOBILITY INFORMATION (Case 1) message on SRB#1 (UM/DCCH) or SRB#2 (AM/DCCH), or a CELL/URA UPDATE CONFIRM message (Case 2) on SRB#1 (UM/DCCH), which configures the UE with the new U-RNTI and indicates the uplink receive PDCP sequence number for each radio bearer configured to support lossless SRNS relocation.

If SRB#1 is to be used, the target RNC establishes the UM RLC entity for SRB#1 and the DL HFN and/or the VT(US) values are set to the values in the RRC container. In performing this step, the DL HFN value may be set to the current DL HFN value incremented by one. In the UM RLC entity, a "Special LI" is preferably used to indicate that an RLC SDU begins in the beginning of an RLC PDU.

If SRB#2 is to be used, the target RNC establishes the AM RLC entity and the DL and UL HFN values are set to the current DL and UL HFN values. Before sending a UTRAN MOBILITY INFORMATION message, the transmitting side of the AM RLC entity initiates RLC RESET procedure to synchronize the HFN values between the UTRAN and UE.

Upon reception by the UE of the message, the UE compares the uplink receive PDCP sequence number with the UE uplink send PDCP sequence number. If this confirms that PDCP SDUs were successfully transferred before the start of relocation (i.e., already received by the source RNC), then these are discarded by the UE. The UE reinitializes the PDCP header compression entities of the radio bearers configured to use a header compression protocol. The RLC (e.g., AM RLC) entity for SRB#2 is (re-)established both on the UTRAN and UE sides, and their HFN values are set to VALUE incremented by one. (Here, VALUE may be defined as either the current HFN value or MAX (UL HFN of SRB2.quadrature. DL HFN of SRB2)).

If the UE has successfully configured itself, it shall send a UTRAN MOBILITY INFORMATION CONFIRM message (Case 1 and Case 2). These messages preferably contain the START values and the downlink receive PDCP sequence number for each radio bearer configured to support lossless SRNS relocation.

Upon reception and acknowledgment by the UTRAN of the message, the UTRAN compares the downlink receive PDCP sequence number with the downlink send PDCP sequence number. The UTRAN initializes the PDCP header compression entities of the radio bearers configured to use a header compression protocol. The RLC entities for affected radio bearers (other than SRB#2) are (re-)established both on the UTRAN and UE side. The HFN values for each RB are preferably set to the START value in the message for the corresponding CN domain, and all the data buffers are flushed.

In case of failure, the UE shall send a UTRAN MOBILITY INFORMATION FAILURE message (Case 1 and Case 2).

Upon reception of the UTRAN MOBILITY INFORMATION CONFIRM/FAILURE (Case 1 and Case 2), the relocation procedure ends.

Combined Cell URA Update and SRNS Relocation

Seamless Radio Bearers

Figure 14:
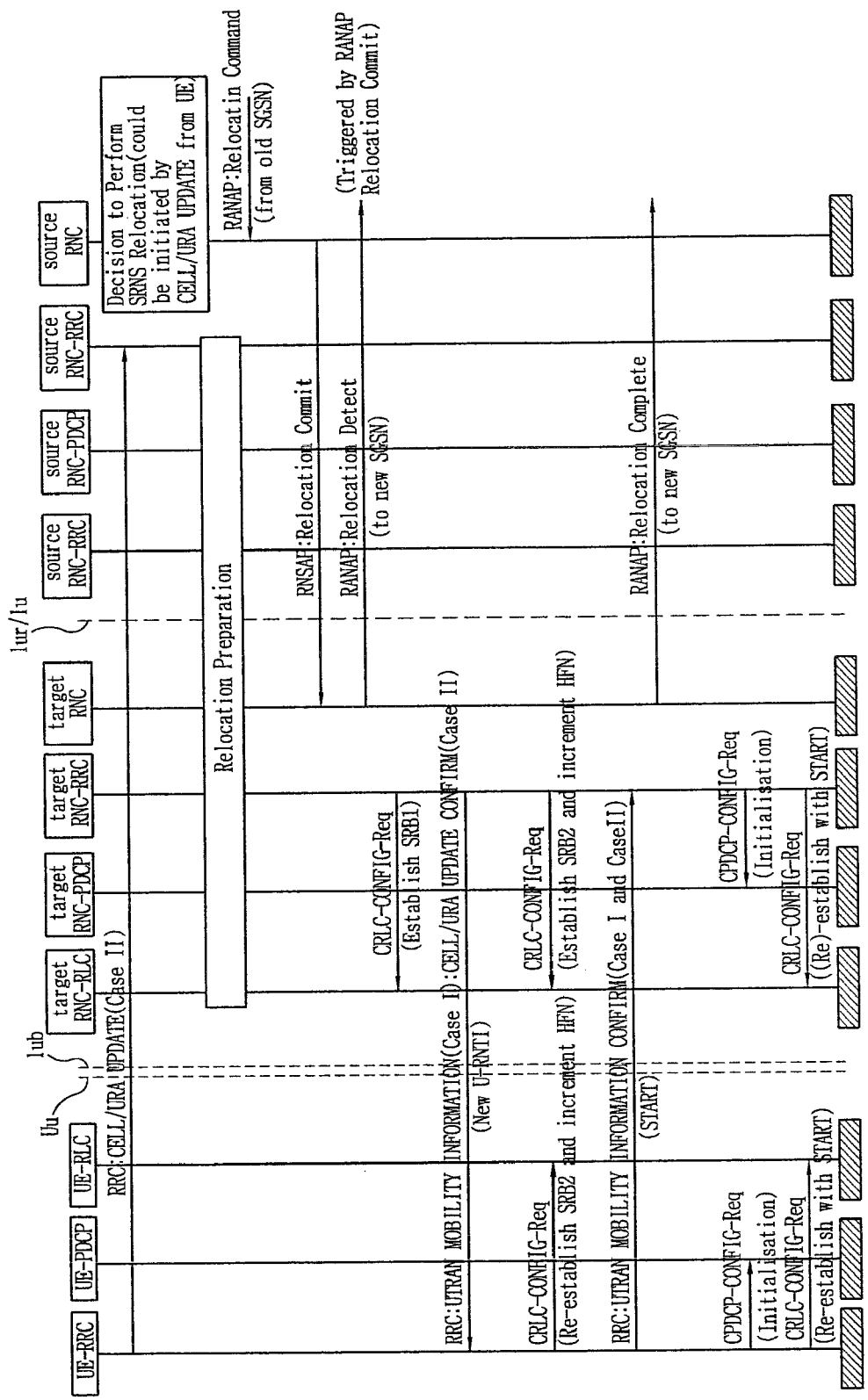
FIG. 14 is a flow diagram showing steps included in an embodiment of the method of the present invention which performs SRNS relocation for the case of seamless radio bearers.

The method of the present invention may be initiated by the source RNC deciding to perform an SRNS relocation. Steps of this method, which have been previously discussed and are re-stated below, are shown in greater detail in FIG. 14. Here, Case 1 represents the situation where the user equipment (UE) is not involved and Case 2 represents the situation wherein the UE is involved and a Combined Cell/URA update and SRNS relocation is performed.

In an initial step, an RANAP Relocation Command is received by the source RNC from the CN, indicating the RABs to be released. The source RNC continues the downlink data transmission on radio bearers supporting seamless SRNS relocation until the target RNC becomes the serving RNC. The target RNC becomes the serving RNC when the RANAP Relocation Detect message is sent.

The target RNC sends a UTRAN MOBILITY INFORMATION message (Case 1) on SRB#1 (UM/DCCH) or SRB#2 (AM/DCCH), or a CELL/URA UPDATE CONFIRM message (case 2) on SRB#1 (UM/DCCH), which configures the UE with the new U-RNTI.

If SRB#1 is to be used, the target RNC establishes the UM RLC entity and the DL HFN value is set to the current DL HFN value incremented by one. In the UM RLC entity, a "Special LI" is preferably used to indicate that an RLC SDU begins in the beginning of an RLC PDU.

If SRB#2 is to be used, the target RNC establishes the AM RLC entity and the DL and UL HFN values are set to the current DL and UL HFN values. Before sending a UTRAN MOBILITY INFORMATION message, the transmitting side of the AM RLC entity initiates RLC RESET procedure to synchronize the HFN values between the UTRAN and UE.

Upon reception by the UE of the message, the RLC entity for SRB#2 is (re-)established both on the UTRAN and UE sides, and their HFN values are set to VALUE incremented by one. (Here, VALUE may be defined as either the current HFN value or MAX (UL HFN of SRB2.vertline.DL HFN of SRB2)).

If the UE has successfully configured itself, it shall send a UTRAN MOBILITY INFORMATION CONFIRM message (Case 1 and Case 2). These message preferably contain the START values (to be used in integrity protection and in ciphering on radio bearers using UM and AM RLC).

Upon reception and acknowledgment by the UTRAN of the message, the UTRAN initializes and the UE re-initializes the PDCP header compression entities of the radio bearers configured to use a header compression protocol. The RLC entities for affected radio bearers (other than SRB#2) are (re-)established both on the UTRAN and UE side. The HFN values for each RB are preferably set to the START value in the message for the corresponding CN domain and all the data buffers are flushed.

In case of failure, the UE shall send a UTRAN MOBILITY INFORMATION FAILURE message (Case 1 and Case 2).

Upon reception of the UTRAN MOBILITY INFORMATION CONFIRM/FAILURE message (Case 1 and Case 2), the relocation procedure ends.

In the foregoing embodiments, to initiate the method the UTRAN may transmit a UTRAN MOBILITY INFORMATION message to the UE on the downlink DCCH using AM or UM RLC. In the case of SRNS relocation, the message may be sent using UM RLC only.

Signaling Radio Bearers/RRC Connection Mobility Procedures Cell and URA Update Procedures When an RRC message is transmitted in DL on DCCH or CCCH or SHCCH using RLC UM, RRC will preferably indicate to the RLC that a special RLC length indicator should be used. The UE may assume that this indication has been given. The special length indicator indicates that an RLC SDU begins in the beginning of an RLC PDU.

Reception of a CELL UPDATE/URA UPDATE message by the UTRAN based on such a special length indicator will now be discussed in accordance with one embodiment of the present invention. When the UTRAN receives a CELL UPDATE/URA UPDATE message, the UTRAN:

1> in the case where the procedure was triggered by reception of a CELL UPDATE:
  2> if SRNS relocation was performed:
    3> transmit a CELL UPDATE CONFIRM message on the downlink DCCH
  2> otherwise:
    3> update the START value for each CN domain as maintained in UTRAN with "START" in the IE "START list" for the CN domain as indicated by "CN domain identity" in the IE "START list";
    3> if this procedure was triggered while the UE was not in CELL_DCH state, then for each CN domain as indicated by "CN domain identity" in the IE "START list";
      4> set the 20 MSB of the MAC-d HFN with the corresponding START value in the IE "START list";
      4> set the remaining LSB of the MAC-d HFN to zero.
    3> transmit a CELL UPDATE CONFIRM message on the downlink DCCH or optionally on the CCCH but only if ciphering is not required; and
    3> optionally include the IE "RLC re-establish indicator (RB5 and upwards" to request an RLC reestablishment in the UE, in which case the corresponding RLC entities should also be re-established in UTRAN; or
1> in the case the procedure was triggered by reception of a URA UPDATE:
  2> if SRNS relocation was performed:
    3> transmit a URA UPDATE CONFIRM message on the downlink DCCH
  2> otherwise:
    3> transmit a URA UPDATE CONFIRM message on the downlink CCCH or DCCH 2> include the IE "URA identity" in the URA UPDATE CONFIRM message in a cell where multiple URA identifiers are broadcast, or
1> initiate an RRC connection release procedure by transmitting an RRC CONNECTION RELEASE message on the downlink CCCH. In particular, the UTRAN should:
  2> if the CELL UPDATE message was sent because of an unrecoverable error in RB2, RB3, or RB4:
    3> initiate an RRC connection release procedure by transmitting an RRC CONNECTION RELEASE message on the downlink CCCH.

Reception of CELL UPDATE CONFIRM/URA UPDATE CONFIRM Message by the UE

When the UE receives a CELL UPDATE CONFIRM/URA UPDATE CONFIRM message; and
  if the message is received on the CCCH and IE "U-RNTI" is present and has the same value as the variable U_NTI; or
  if the message is received on DCCH;

the UE may:
  if the CELL UPDATE CONFIRM message includes the IE "RLC reestablish indicator (RB2, RB3, and RB4)";
    reestablish the RLC entities for signaling radio bearer RB2, signaling radio bearer RB3 and signaling radio bearer RB4 (if established);
  if the value of the IE "Status" in the variable CIPHERING_STATUS of the CN domain stored in the variable LATEST_CONFIGURED_CN_DOMAIN is set to "Started";
    set the HFN values for AM RLC entities with RB identity 2, RB identity 3 and RB identity 4 (if established) equal to the START value included in the latest transmitted CELL UPDATE message for the CN domain stored in the variable LATEST_CONFIGURED_CN_DOMAIN;

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of relocating a serving radio network controller, comprising:
sending at least one of a ciphering parameter value and a first radio link control protocol data unit (RLC PDU) sequence number from a first radio network controller to a second radio network controller,
wherein the ciphering parameter value comprises uplink and downlink ciphering parameter values, and
wherein the first RLC PDU sequence number is contained within a state variable;
using the at least one of the ciphering parameter value and the first RLC PDU sequence number for ciphering a first data to be sent to a terminal by the second radio network controller; and comparing the uplink ciphering parameter value and the downlink ciphering parameter value by at least one of the terminal and the second radio network controller.

2. The method of claim 1, wherein the ciphering parameter value comprises an uplink ciphering parameter value.

3. The method of claim 1, wherein the ciphering parameter value comprises a downlink ciphering parameter value.

4. The method of claim 3, wherein the downlink ciphering parameter value is incremented by one, which is used with the first sequence number to cipher the first data.

5. The method of claim 3, wherein the first data is ciphered using the downlink ciphering parameter value and the first sequence number.

6. The method of claim 1, wherein the ciphering parameter value is a hyper frame number.

7. The method of claim 1, wherein the first RLC PDU sequence number is a next data unit number which the terminal expects to receive on a downlink.

8. The method of claim 7, wherein the first RLC PDU sequence number is incremented by one each time data is transmitted.

9. The method of claim 1, wherein a VT(US) is initialized by using the state variable.

10. The method of claim 1, wherein the state variable is an unacknowledged mode state variable.

11. The method of claim 1, wherein the ciphering parameter value and the first sequence number allows the second radio network controller to become the serving radio network controller.

12. The method of claim 1, further comprising: establishing a first RLC entity within the second radio network controller.

13. The method of claim 12, wherein the first RLC entity is an unacknowledged mode RLC entity.

14. The method of claim 1, further comprising establishing a first signaling radio bearer within the second radio network controller.

15. The method of claim 14, wherein the first signaling radio bearer is SRB#1.

16. The method of claim 14, wherein the second radio network controller becomes the serving radio network controller by or the step to obtain the prescribed ciphering parameter value includes:
establishing a first RLC entity within the second radio network controller;
transmitting the ciphered first data to the terminal by the second radio network controller;
establishing a second RLC entity within the second radio network controller, wherein the ciphering parameter value comprises uplink and downlink ciphering parameter values; and
comparing the uplink ciphering parameter value or the downlink ciphering parameter value by at least one of the terminal and the second radio network controller.

17. The method of claim 16, further comprising:
selecting a larger value between the uplink ciphering parameter value and the downlink ciphering parameter value by at least one of the terminal and the second radio network controller; and
incrementing the selected ciphering parameter value by one, and using the incremented ciphering parameter value as the prescribed ciphering parameter values in at least one of the terminal and the second radio network controller.

18. The method of claim 17, further comprising:
ciphering a second data using the incremented ciphering parameter value and a second sequence number by the terminal, wherein the second data includes a start value of the incremented ciphering parameter value;
transmitting the ciphered second data from the terminal to the second radio network controller; and
deciphering the ciphered second data by the second radio network controller using the incremented ciphering parameter value.

19. The method of claim 18, further comprising:
modifying other ciphering parameter values based on the start value in both the terminal and the second radio network controller for other radio bearers; and
transmitting and receiving data between the terminal and the second radio network controller.

20. The method of claim 1, wherein the first data includes control information.

21. The method of claim 20, wherein the first data is a radio resource control message.

22. The method of claim 21, wherein the radio resource control message is one of UTRAN MOBILITY INFORMATION message and CELL/URA UPDATE CONFIRM message.

23. The method of claim 1, further comprising transmitting the ciphered first data to the terminal by the second radio network controller.

24. The method of claim 1, further comprising: establishing a second RLC entity within the second radio network controller.

25. The method of claim 24, wherein the second RLC entity is an acknowledged mode RLC entity.

26. The method of claim 1, further comprising establishing a second signaling radio bearer within the second radio network controller.

27. The method of claim 26, wherein the second signaling radio bearer is SRB#2.

28. The method of claim 1, further comprising:
selecting a larger value between the uplink ciphering parameter value and the downlink ciphering parameter value by at least one of the terminal and the second radio network controller.

29. The method of claim 28, further comprising:
incrementing the selected ciphering parameter value by one, and using the incremented ciphering parameter value as uplink and downlink ciphering parameter values in at least one of the terminal and the second radio network controller.

30. The method of claim 29, further comprising:
ciphering a second data using the incremented ciphering parameter value and a second sequence number by the terminal.

31. The method of claim 30, wherein the second data includes control information.

32. The method of claim 31, wherein the second data is a radio resource control message.

33. The method of claim 32, wherein the radio resource control message is an UTRAN MOBILITY INFORMATION CONFIRM message.

34. The method of claim 30, wherein the second data includes a start value of the incremented ciphering parameter value.

35. The method of claim 34, wherein the start value comprises first twenty most significant bits of the incremented ciphering parameter value.

36. The method of claim 34, further comprising:
transmitting the ciphered second data from the terminal to the second radio network controller; and deciphering the ciphered second data by the second radio network controller using the incremented ciphering parameter value.

37. The method of claim 36, further comprising:
modifying other ciphering parameter values based on the start value in both the terminal and the second radio network controller for other radio bearers; and
transmitting and receiving data between the terminal and the second radio network controller.

38. The method of claim 1, further comprising using the ciphering parameter value to obtain a prescribed ciphering parameter value for use in an uplink and a downlink.

39. A method of relocating serving radio network sub-systems, each radio network sub-system including a radio network controller and one or more base stations, the method performed by a target radio network controller characterized by:
receiving ciphering information and a state variable value from a source radio network controller, wherein the ciphering information comprises at least one of downlink hyper frame number and uplink hyper frame number;
establishing an unacknowledged mode radio link control entity by configuring a first signaling radio bearer;
ciphering a first data in the unacknowledged mode radio link control entity using the ciphering information and the state variable value received from the source radio network controller;
transmitting the ciphered first data to a mobile terminal;
establishing an acknowledged mode radio link control entity by configuring a second signaling radio bearer; and
determining a greater value between the downlink hyper frame number and the uplink hyper frame number, and incrementing the determined greater value by one.

40. The method of claim 39, wherein the unacknowledged mode radio link control entity initializes a VT(US) using the state variable value received from the source radio network controller.

41. The method of claim 40, wherein the VT(US) is a next-in-sequence radio link control protocol data unit sequence number which the mobile terminal expects to receive.

42. The method of claim 40, wherein VT(US) is the sequence number of a next radio link control protocol data unit to be transmitted for the first time.

43. The method of claim 39, wherein the first data is a radio link control protocol data unit including a radio resource control message.

44. The method of claim 43, wherein a length indicator is included in a header of the radio link control protocol data unit.

45. The method of claim 44, wherein the length indicator indicates that a service data unit begins at the beginning of a radio link control protocol data unit.

46. The method of claim 39, further comprising:
deciphering a second data including a start value by using the determined greater value incremented by one.

47. The method of claim 46, further comprising:
configuring at least one hyper frame number value of each radio bearer other than said second radio bearer to the start value.

48. The method of claim 39, wherein the first signaling radio bearer is SRB#1.

49. The method of claim 39, wherein the second signaling radio bearer is SRB#2.

50. A method of relocating serving radio network sub-systems, each radio network sub-system including a radio network controller and one or more base stations, the method performed by a mobile terminal characterized by:
receiving first data which was ciphered by using a first ciphering information and a first state variable value received from a source radio network controller, wherein the first ciphering information comprises at least one of downlink hyper frame number and an uplink hyper frame number;
re-establishing an acknowledged mode radio link control entity by configuring a signaling radio bearer; and
determining a greater value between the downlink hyper frame number and the unlink hyper frame number, and incrementing the determined greater value by one.

51. The method of claim 50, further comprising: ciphering a second data including a start value by using the determined greater value incremented by one.

52. The method of claim 51, further comprising:
configuring at least one hyper frame number value of each radio bearer other than said second radio bearer to the start value.

53. The method of claim 50, wherein the signaling radio bearer is SRB#2.

* * * * *